US007505609B1

(12) United States Patent
Hartman et al.

(10) Patent No.: US 7,505,609 B1
(45) Date of Patent: Mar. 17, 2009

(54) REMOTE MEASUREMENT OF OBJECT ORIENTATION AND POSITION

(75) Inventors: Richard Leon Hartman, Huntsville, AL (US); Keith Bryan Farr, Madison, AL (US); Michael Kevin Balch, Madison, AL (US)

(73) Assignee: Advanced Optical Systems, Inc., Huntsville, AL (US)

( * ) Notice: Subject to any disclaimer, the term of this patent is extended or adjusted under 35 U.S.C. 154(b) by 312 days.

(21) Appl. No.: 11/217,621

(22) Filed: Sep. 1, 2005

Related U.S. Application Data

(63) Continuation-in-part of application No. 10/831,587, filed on Apr. 22, 2004.

(60) Provisional application No. 60/464,479, filed on Apr. 22, 2003, provisional application No. 60/606,152, filed on Sep. 1, 2004.

(51) Int. Cl.
*G06K 9/00* (2006.01)

(52) U.S. Cl. ...................................... 382/103; 382/103

(58) Field of Classification Search ................. 382/103, 382/106, 107, 153, 217, 278, 273, 285, 295, 382/211; 244/3.17
See application file for complete search history.

(56) References Cited

U.S. PATENT DOCUMENTS 3,638,025 A * 1/1972 Dishington et al. ......... 382/103
3,779,492 A * 12/1973 Grumet ..................... 244/3.17
4,470,048 A * 9/1984 Short, III .................... 342/189
4,892,408 A * 1/1990 Pernick et al. ............. 356/400
4,972,498 A * 11/1990 Leib .......................... 382/211
4,995,088 A * 2/1991 Farhat ......................... 706/40
5,185,815 A * 2/1993 Brandstetter ................ 382/211
5,381,154 A * 1/1995 Guerci ........................ 342/90
2003/0137647 A1* 7/2003 Hasson et al. ............. 356/5.01

* cited by examiner

*Primary Examiner*—Jayesh A Patel
(74) *Attorney, Agent, or Firm*—Mark Clodfelter

(57) ABSTRACT

Methods for using training images to define correlation strength surfaces about reference filters, permitting direct solution of position and orientation using images of a target object with only a few reference filters are disclosed. Correlations of selected reference filters with training images are used to develop expressions describing shapes of respective correlation surfaces at incremental changes relative to an aspect or range used for a filter. Correlations of target images with only a few reference filters may then be used to define target orientation and range in many real-world applications. A method for determining target object orientation and/or range based on interpolations, using results of correlations of a target image with composite filters having reduced sensitivities for different orientation axes, or range, is also disclosed. Techniques for using training images to create such composite filters are disclosed, as are extensions of methods to additional dimensions.

7 Claims, 22 Drawing Sheets

REMOTE MEASUREMENT OF OBJECT ORIENTATION AND POSITION

CROSS REFERENCE TO RELATED APPLICATIONS

This application is a continuation-in-part of Applicant's copending patent application Ser. No. 10/831,587, filed Apr. 22, 2004, which is hereby incorporated herein by reference in its entirety, and which claimed the benefit of Applicant's provisional patent application 60/464,479, filed Apr. 22, 2003, which is also hereby incorporated herein by reference in its entirety. This application also claims the benefit of Applicant's copending U.S. provisional patent application No. 60/606,152, filed Sep. 1, 2004, which is hereby incorporated herein by reference in its entirety.

FIELD OF THE INVENTION

The instant invention relates generally to the field of remote measurement of object position (e.g., range and bearing in azimuth and elevation) and orientation (e.g., roll, pitch, and yaw) based on analyses or correlations of images of an object acquired or generated using data from optical, radar, passive microwave or other sensors capable of providing remotely sensed data for generating images based on object attributes.

BACKGROUND OF THE INVENTION

There are situations where it is necessary to remotely measure relative position and orientation of an object using imagery of the object acquired remotely using optical, radar, passive microwave, or other sensors capable of providing data from which images may be generated. Such imagery may be conventional images, as may be generated by a conventional video camera using ambient light or flash photography, or other types of images generated from data produced by active, semi-active, or passive sensors, and may include, for example, synthetic aperture radar images, or inverse synthetic aperture radar images, or other images produced from radar data, or infrared images produced by a passive IR sensor.

A specific problem that led to development of the instant invention is measurement of position and orientation of one aircraft relative to another for purposes of flying an unmanned aerial vehicle in formation, such as formations supporting aerial refueling. However, the instant invention has much broader applications, including applications in determining object orientation to support autonomous, robotic servicing of satellites, robotic grasping and manipulating of objects in assembly lines, or other automated production or maintenance operations.

One method for remote measurement or estimation of object orientation involves use of a matched filter correlator, such as described by VanderLugt, with an extensive library of matched filters for different reference object orientations, in a practical system implementation such as described by Hartman and Farr in U.S. patent application Ser. No. 10/831,587. In a method disclosed earlier, orientation of an object relative to a position of an image-producing sensor may be determined by using a succession of matched filter correlations with an image of an object using reference filters generated for different viewing angles and ranges of a reference object. Such reference filters may be generated in sets at several ranges from a reference object, with each set including reference filters generated, for example, at 5, 1, or 0.5 degree increments in each of roll, pitch, and yaw, depending upon object complexity and desired resolution of angular measurement of object orientation. Ranges for reference filter sets may be selected, for example, at intervals where scale size of a target image changes by 10 percent. In this method, a correlation producing a highest correlation peak using a reference filter for a given range and orientation (i.e., combination of roll, pitch, and yaw) may be taken as a best estimate of object orientation. In this method, interpolation between correlations using adjacent reference filters (i.e., those nearest in roll, pitch, or yaw to a reference filter producing a highest correlation peak) may be used to further refine an estimate of object orientation. An undesirable requirement of this method, however, is that it may be necessary to generate and store a large number of reference filters, and make a significant number of comparisons using multiple reference filters in order to measure orientation of an object down to accuracies of a degree or so in roll, pitch, and/or yaw, or to obtain range accuracies of a few percent of range. This may impose undesirable storage and processing burdens, particularly on real-time systems, such as may be used in automated guidance systems.

The instant invention provides a method for measuring object orientation that requires far fewer reference filters and fewer correlations, at time of measurement of orientation of an object of unknown orientation, to obtain similar accuracy and precision in measuring object orientation. These innovations offer significant advantages for real-time applications where orientation of an object must be rapidly determined from remote observations, but may also be beneficial in other applications as well. In this application, "orientation," "aspect," "pose," and "attitude" have the same meaning with reference to an object's orientation with respect to a point from which an observation is taken.

DETAILED DESCRIPTION OF THE DRAWINGS

As disclosed in Applicants' prior U.S. patent application Ser. No. 10/831,587, a reference filter for use in an optical or computational image correlator may be developed from an image of a reference object by generating a complex conjugate of a Fourier transform of an image of the reference object taken from a particular viewing angle, also called aspect angle or simply aspect, and for a particular scale or range to an object. A reference object may be an actual physical object that is the same as, or that closely resembles, a real-world object, also called target object herein, for which remote measurement of orientation is desired. A reference object may also be a physical model, such as a scale model of an aircraft, or a mathematical model (such as a rendered model generated in a computer aided drawing program) that adequately models attributes of an object. A reference filter thus generated contains information related to attributes of a reference object when viewed from a particular aspect from which the image used to generate a reference filter was taken or created. Thus, a reference filter contains information related to a particular orientation of the reference object relative to a camera or other sensor, and also contains information related to scale of an object, which in many applications may be related to a range to the object.

Figure 1:
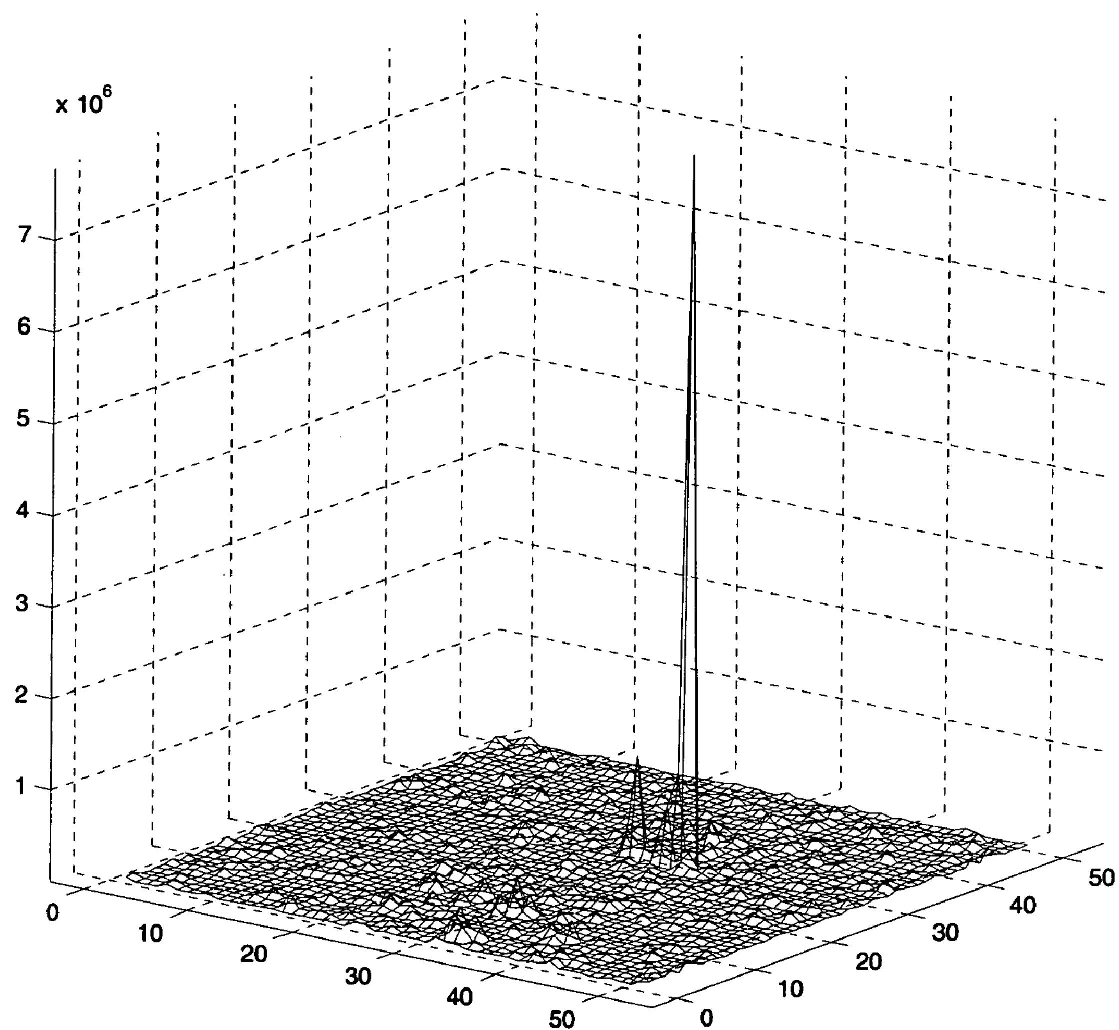
FIG. 1 is a view of a representative correlation peak resulting from correlation of a reference filter for an object with an image of the reference object.

When a reference filter thus created for a particular scale is used to perform correlations with images of the same reference object viewed from various aspects, a highest correlation peak will generally occur for an image taken from the same aspect and scale/range from which an image used to create the reference filter was taken. As described in Applicants' prior patent application Ser. No. 10/831,587, correlations may be performed using an optical correlator, such as an optical correlation system employing a VanderLugt correlator, or by a computational correlator that may perform mathematical multiplication of a Fourier transform of an image array with a reference filter array, and then perform an inverse Fourier transform to obtain a correlation map, also called a similarity map, which similarity map having a correlation peak with a height indicating correlation strength. Position of a correlation peak within a similarity map indicates the position of the corresponding object within the image, and conventional techniques may then be used to determine a corresponding bearing to that object. Methods of the instant invention may also be used with correlations performed using other techniques. For a given scale/range, correlation strengths (i.e., the heights of correlation peaks, such as the correlation peak illustrated in FIG. 1) resulting from correlations performed using images of the reference object taken at different aspects will generally fall off at some rate as a viewing aspect is incrementally varied in a roll, pitch, or yaw angle, or some combination thereof, relative to the aspect for which a particular reference filter was created. Similarly, correlation strengths resulting from correlations of reference filters with images of the reference object taken at different ranges also fall off in strengths or intensity as range changes from the range for which a given reference filter, or set of reference filters, was created. Thus, a correlation peak occurring when a correlation is performed using an image taken from the same aspect and scale/range as a given reference filter is generally at least a local maximum compared to correlation strengths obtained for the same reference filter correlated with images of the reference object taken from different aspects, or for the same aspect at different scales/ranges. For objects that lack symmetry in at least one dimension, a rate of falloff of correlation strength for a particular reference filter, when correlated with images taken at various aspects, will generally be different as a reference object is rotated to different aspects (i.e., rate of falloff in correlation strength may be different as an object is rotated by the same increment in a pitch angle versus a yaw angle). If one plots correlation strengths (i.e., height of correlation peaks) resulting from multiple correlations of a given reference filter, made for a given scale/range, with multiple images of a reference object taken at the same scale/range but at different aspects as the reference object is rotated and imaged in incremental steps in viewing angle (e.g., in pitch and yaw and combinations thereof), a "correlation strength surface" may be defined above corresponding reference axes (e.g., pitch and yaw reference axes in the current example) in some coordinate system. For a typical complex reference object, such as an aircraft or a satellite, shape of a correlation strength surface for a reference filter created for one aspect and scale/range will generally be different from a shape of a correlation strength surface for a reference filter created for a different aspect, or orientation, but at the same scale/range.

Shape of a correlation strength surface representing a falloff in correlation strength, Z, with viewing aspect of a reference object, for a particular reference filter, may be approximated by using correlation strength measurement results from multiple discrete correlations, at different viewing angles, at a given scale/range, to perform curve fits or otherwise solve for coefficients, c, $a_1$, $b_1$ in a suitable equation, such as:

$$Z=c+a_1X+b_1Y+a_2X^2+b_2Y^2+a_3X^3+b_3Y^3+ - - - . \quad (1)$$

where X and Y are viewing aspect coordinates, such as pitch, yaw, roll and range.

Such an equation may then be used to obtain approximations, over some limited angular range of validity, of an expected correlation strength for a given reference filter when correlated with images of the reference object taken at different aspects, but at the same scale/range. As noted later herein, other expressions including exponential or other expansions may also be used to describe a surface in an n-dimensional coordinate system.

These equations for different correlation strength surfaces associated with each different reference filter may thus be determined in advance of an operational application or mission if suitable images of a real target object, from different aspects, or images derived from physical or mathematical reference models that adequately model attributes of the target object, are available for a real world target object for which orientation is to be remotely measured. Effects of scale/range may be treated as an additional dimension in these a priori reference data sets and/or curve fits.

Accordingly, one feature of the instant invention involves a priori determination of shapes of correlation strength surfaces, or generation of reference data sets, in an n-dimensional coordinate system, that represent falloffs of correlation strengths with aspect as multiple images of a reference object, created as the aspect of the reference object is changed in incremental steps from an aspect used to generate a particular reference filter, are correlated with that particular reference filter for a particular scale/range. This a priori knowledge of shape of a correlation strength surface in a neighborhood or region of angular orientation of each of a few correlation filters may then be used, for a given scale/range interval, to support a direct solution of an object's orientation with high angular resolution using correlation strength measurements made using an image of the object with only a few reference filters that surround or bracket several possible angular orientations of an object. In a similar manner, a direct solution for range may be developed by using correlations of a target image with reference filters created for different ranges to determine correlation contours on correlation strength surfaces developed for range changes, and then solving for intersections of such contours. This method is particularly amenable to those situations, such as an automated air refueling approach to a tanker aircraft, where some external knowledge, derived from other sources of exogenous information, such as flight direction, may be used to determine possible ranges and/or angular extents (i.e., roll, pitch, yaw) of orientations of a target object (e.g., tanker aircraft) before correlation measurements are made using one or more images from a particular aspect and range to refine an estimate of target orientation and/or range. This external knowledge of possible values of one or more orientation angles or range may be used to support selection of a smaller set of reference filters that encompass outer values of possible target orientation angles or ranges for a given approach angle or aspect. This key innovation of a priori determination of shape of an n-dimensional correlation response surface for each reference filter minimizes reference filter storage requirements and improves accuracy and speed of measurement of orientation of a target. This is particularly the case for complex target objects, such as an aircraft, that are significantly asymmetrical in at least some dimensions. This method of using a reference data set, or a priori knowledge, of shapes of correlation strength surfaces to rapidly determine a target object's orientation with fewer reference filters is described in more detail, with examples, later herein.

The innovation of a priori determination of shapes of correlation strength surfaces or curves for a set of reference filters may also be applied in a related but different method. In this second method, composite filters having reduced sensitivity to changes in aspect in one or more directions, e.g., yaw, but retaining sensitivity for changes in aspect in another orientation direction, e.g., roll, are generated, and then pairs or other groupings of these filters are used to perform interpolations, based on a value of a correlation peak for a target object, to estimate orientation of the target object in a direction for which sensitivity was retained (e.g., roll, in the present example). Thus, when multiple sets of composite filters are used, with each set retaining sensitivity to aspect changes in one direction (i.e., roll, pitch, or yaw), separation interpolations may be performed for each orientation axis (e.g., roll, pitch, and yaw), in order to obtain a better estimate of a target objects orientation based on correlations with only a small set of composite reference filters that bracket the orientation of a target object. One technique for generating a composite reference filter with reduced sensitivity to one direction (e.g., yaw) is to use multiple images of a target taken as orientation of a reference object is changed incrementally in only the yaw orientation axis, also referred to herein as the yaw direction. For example, four images may be used spanning an aspect change of two degrees in yaw (i.e., 0.5 degree increments). To create a composite reference filter with reduced sensitivity to yaw, a two-dimensional Fourier transform may be performed on each reference image, with each transform yielding an array of complex-valued numbers. These Fourier transform arrays may then be summed, using complex arithmetic, into one complex-valued array. Taking a complex conjugate of the complex summation array yields an array that may be used as a reference filter having the desired reduced sensitivity for orientation changes of a reference or target object in the yaw direction. Other techniques for generation of composite filters with different sensitivities and properties may also be used with methods of the instant invention. Several techniques for creating composite reference filters with different properties and sensitivities are discussed in a paper by B. V. K. Vijaya Kumar entitled “Tutorial survey of composite filter designs for optical correlators” and published in the 10 Aug. 1992 issue (Vol. 31, No. 23) of Applied Optics, pp 4773-4801), and which is hereby incorporated by reference in its entirety. In one embodiment of the instant invention, e.g., in an air refueling approach application, an image of a target tanker aircraft may be correlated with each of several composite reference filters selected based on exogeneous information to bracket a true orientation of the target tanker aircraft, and then results of these correlation may be used in interpolations to obtain refined estimates of orientation in each axis (e.g., yaw and pitch) for the target tanker aircraft. This second method is also further described and illustrated later herein.

Figure 2:
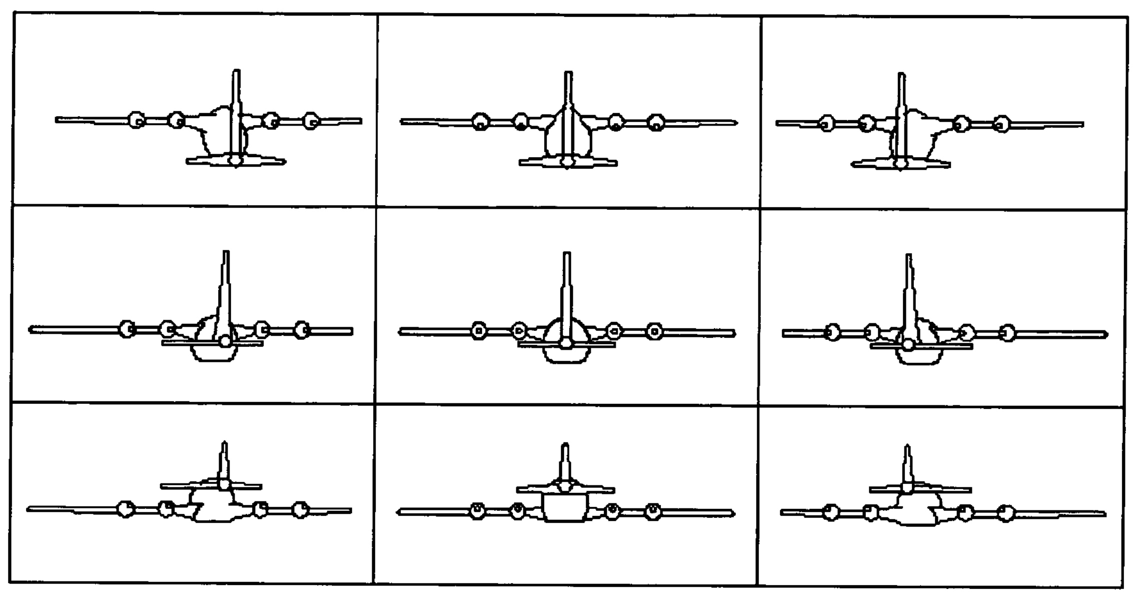
FIG. 2 is a multipart illustration showing an aircraft as viewed from different aspects in pitch and yaw, with roll and range held constant.

The following discussion now describes more fully a method of determining orientation of a target object based on a priori determination of shapes of correlation strength surfaces about each of a few reference filters, which are derived from different viewing aspects within a possible range of object orientations for a particular application. Some applications may require reference filters derived for any combination of roll, pitch, or yaw of a target, but other applications, such as a refueling approach to a tanker aircraft, may permit use of a smaller number of reference filters that address a smaller range of possible orientations. This discussion of a method for determining aspect of an object in 3 degrees of freedom (e.g., roll, pitch, yaw) using only a small number of reference filters starts with consideration of measurement of coupled aspect measurement in 2 degrees of freedom. As used herein, coupled aspect is a term used to refer to a more general real-world situation where two or more aspects of a target object may vary simultaneously, but not necessarily at the same angular increments or rates, in multiple rotational axes (e.g., roll, pitch, and yaw) in a particular coordinate or reference system. For example, and as shown in FIG. 2, images of a tanker aircraft are shown exhibiting changes in pitch and yaw. Changes in orientation across any row of FIG. 2 are generally due to changes in yaw only. Similarly, changes in orientation for any column generally represent changes in pitch only. However, changes in orientation between images in any diagonal direction in FIG. 2 represent coupled aspect changes in pitch and yaw. In a more complex example, changes in roll may be represented as well.

For initial discussion, assume that correlation signal strength as an absolute measurement is meaningful. Later, the discussion is generalized to relative signal strengths in order to accommodate changes in illumination, paint, and other conditions and attributes of a target.

The first method described earlier herein, which will be subsequently referred to herein as a correlation surface method, includes a training phase, illustrated in FIG. 3, wherein data sets are collected and used to build a set of reference filters. The correlation strength surface is then approximated around each reference filter. In an application phase, illustrated in FIG. 5, a priori developed filters and characterizations of correlation strength surfaces are applied to determine orientation of a target object. An application phase may involve near real-time operation and tracking to support missions such as air refueling or manufacturing operations, or non-real-time post-processing of image data for quality control or other purposes.

Figure 3:
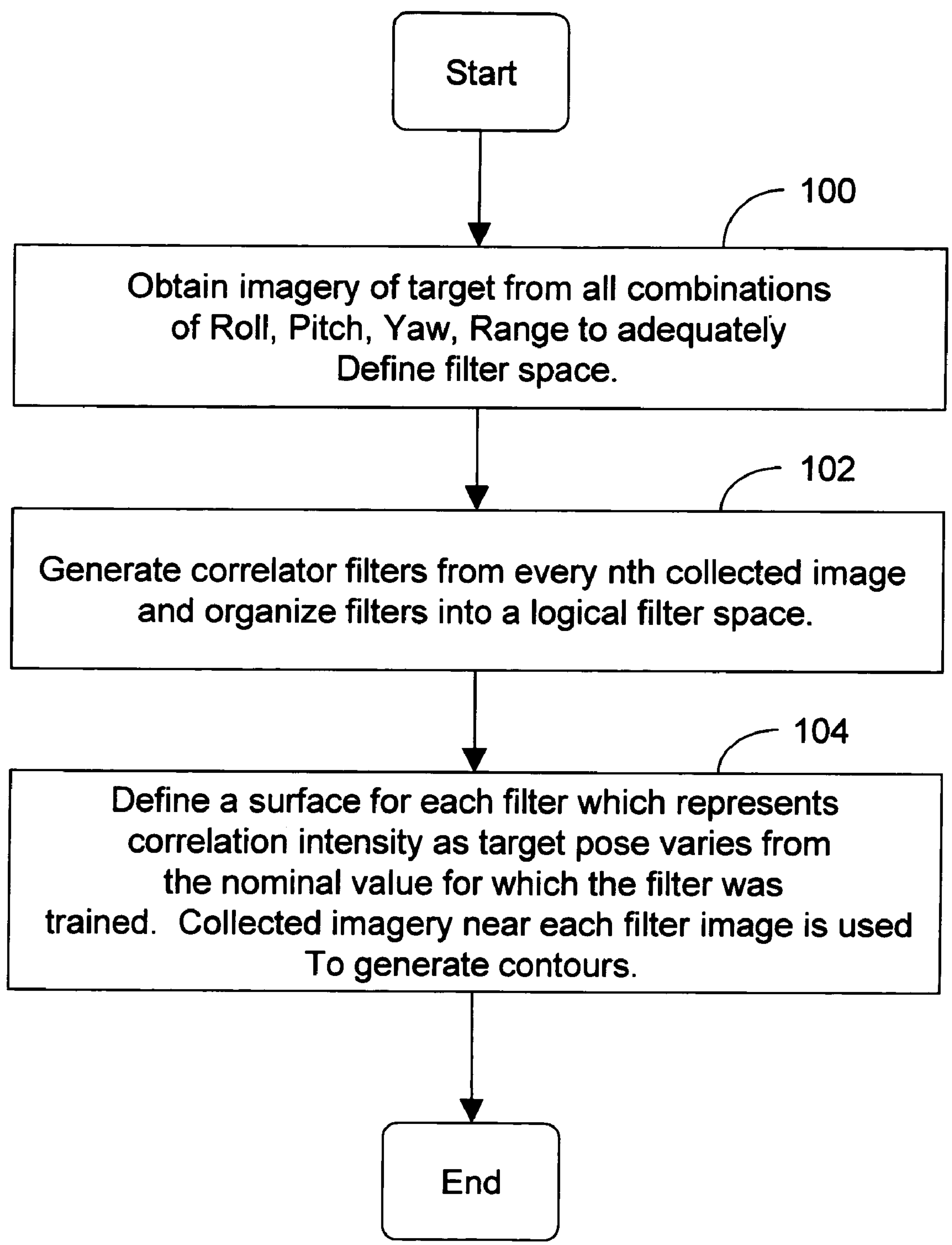
FIG. 3 is a flowchart providing an overview of steps in a training phase of a correlation strength surface method of the instant invention.
Figure 4:
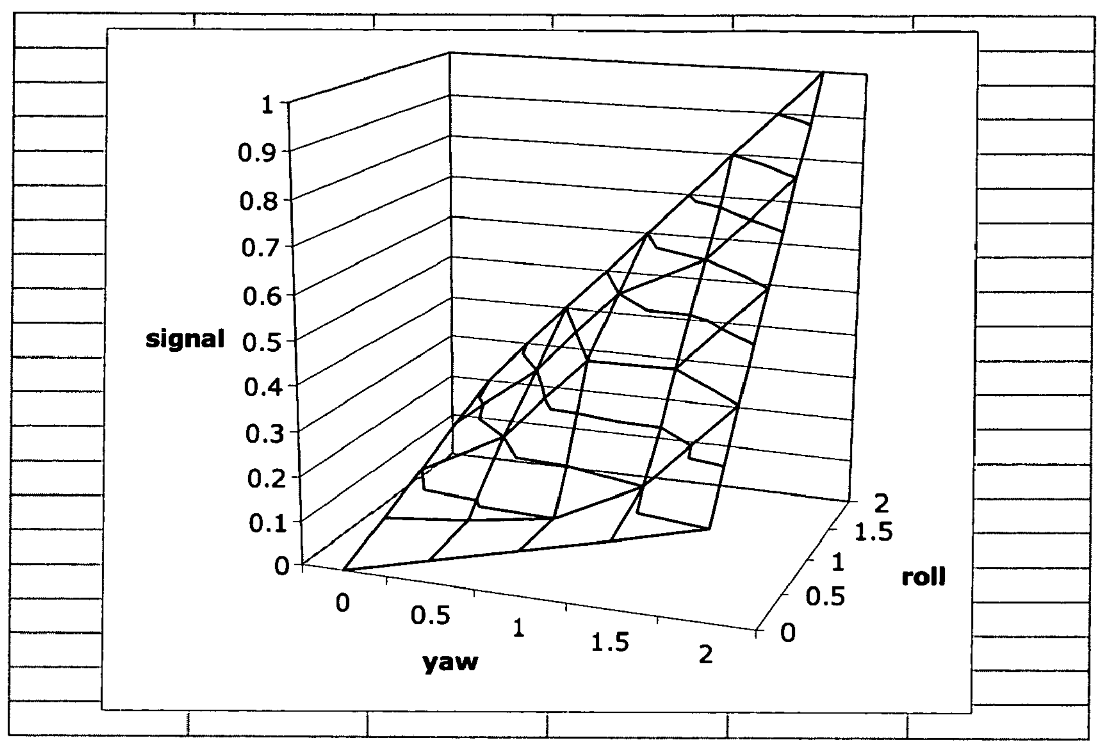
FIG. 4 is a wire frame representation of a portion of a correlation strength surface for yaw and roll variations from an aspect used for a reference filter.

In FIG. 3, at box 100, an early step is generation of reference images to support development of reference filters and characterization of correlation strength surfaces in an orientation or range region, also called a neighborhood, near the reference aspect for each filter. This may be performed, for example, by using a scale model of a target object mounted on an indexed platform, or stage. So mounted, the scale model, serving as a reference object, may be rotated in measured or selected increments of roll, pitch, and/or yaw directions. Images may then be acquired from each of several known orientation positions. This image acquisition procedure, for different orientations, may also be repeated for each of several ranges or scales. This training imagery should include images in all orientations (i.e., roll, pitch, yaw) that may be encountered by a sensor during use in an application phase. For example, reference imagery may be acquired in 5 degree increments over those aspects (e.g., roll, pitch, and yaw) of a target object that are expected to be encountered during operational use or applications of reference filters, or, for example, in 0.5 degree increments over a plus or minus 5 degree range in pitch and yaw for a refueling aircraft, if a constant (i.e., horizontal) roll angle may be safely assumed, or over some other angular extent appropriate to a given application, with a resolution that may be determined by a desired resolution in orientation measurement. At box 102, a grid of reference filters may be developed, using, for example, techniques described in Applicants' prior patent application Ser. No. 10/831,587, from a subset of the images, for example, using every nth image, or using images selected to provide a more or less regular grid, in increments of roll, pitch, and/or yaw, or in increments selected to provide enhanced resolution for those orientations of a target object where enhanced measurement resolution is desired. At box 104, reference images taken at orientations near an orientation used to develop a reference filter are then used in correlations with that reference filter, and correlation strength results from each correlation are used to determine shape of the correlation strength surface near that filter. Results from correlations used to determine shape of a correlation strength surface are also referred to as training sets. A training set is built from correlation signal strengths of reference or training images against a filter developed from a reference image at a known aspect, for example, yaw, pitch=2,2, where units may be in degrees, using techniques disclosed in Applicants' prior patent application Ser. No. 10/831,587. A surface may be generated by plotting correlation signal strength for a number of discrete points (e.g., 16 points in this example), with each point representing a correlation signal strength for a training image taken at a particular combination of orientation angles (e.g., roll, yaw) when correlated with a given reference filter. An example of a correlation strength surface is illustrated in FIG. 4. Discrete point measurements may be used to generate a surface through curve fitting to an equation such as Equation (1) shown earlier and repeated here for convenience:

$$Z=c+a_1X+b_1Y+a_2X^2+b_2Y^2+a_3X^3+b_3Y^3+ \cdots \quad (1)$$

In this example, 7 parameters are fitted by 16 data points, providing statistical redundancy. It should be recognized that other surface equations may be tailored to particular applications. Other expressions that may be selected to describe a correlation strength surface include power series expansions or expressions with exponential terms. For a given application or target object complexity, an expression for a correlation strength surface may need more terms, or may provide sufficient accuracy with fewer terms. For some applications, expressions having cross-terms (e.g., as in conic sections) may be used to define a correlation strength surface.

A correlation strength surface, such as illustrated in FIG. 4, is generated for each of the reference filters. For applications such as the air refueling approach example described above, reference filters may be generated for aspects that bound the expected extent of approach angles. For such cases, it may be sufficient to generate correlation strength surfaces for only those aspects between the bounding aspects for which reference filters are developed. However, for other applications, it may be necessary to generate correlation strength surfaces for all aspects about or surrounding or within the aspects used for at least some of the reference filters. Since expressions describing correlation strength surfaces are generated in advance using training image sets, curve fitting calculations are also performed in advance and do not impact speed of real time operations.

Figure 5:
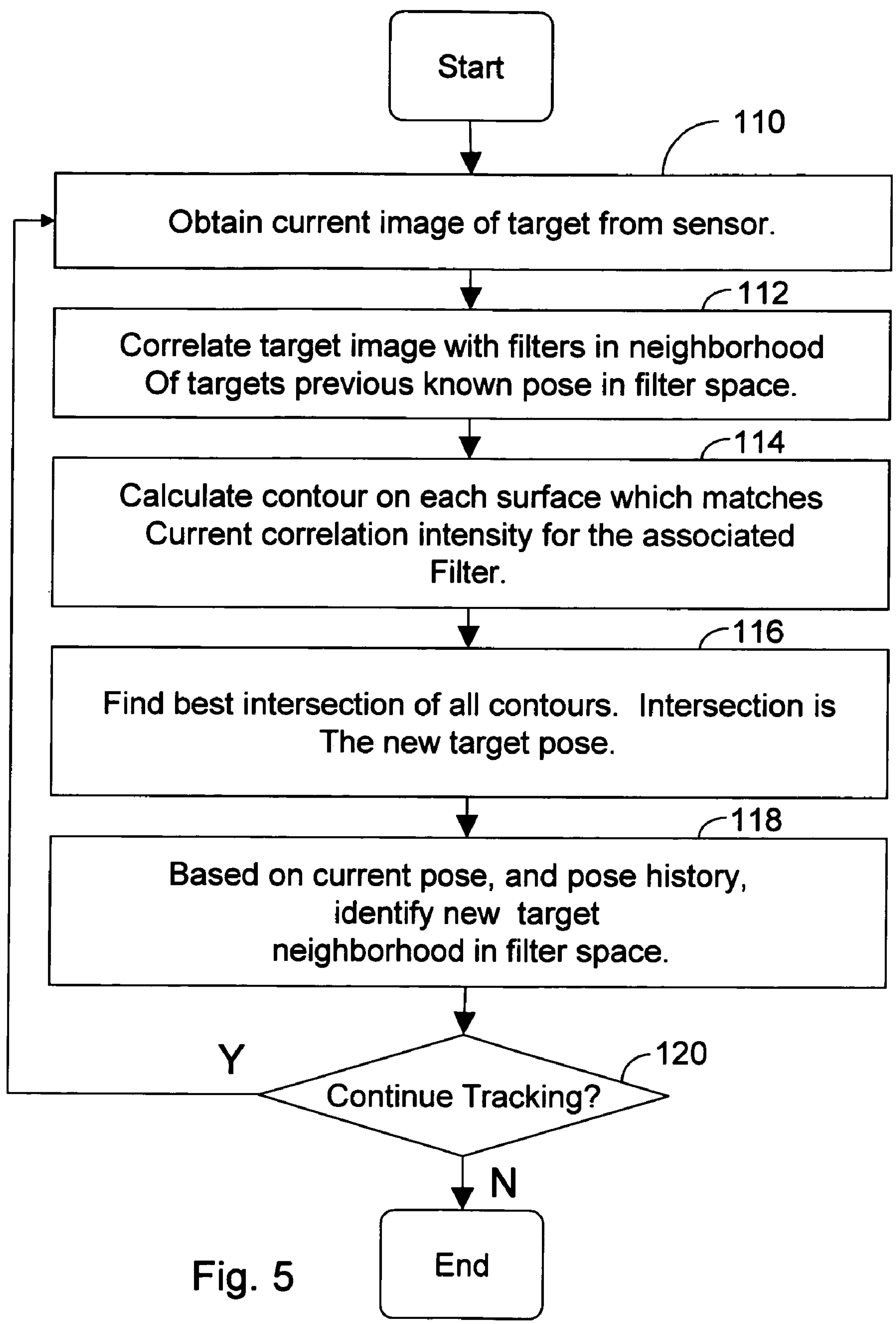
FIG. 5 is a flowchart providing an overview of steps in an application phase of a correlation strength method of the instant invention.
Figure 6:
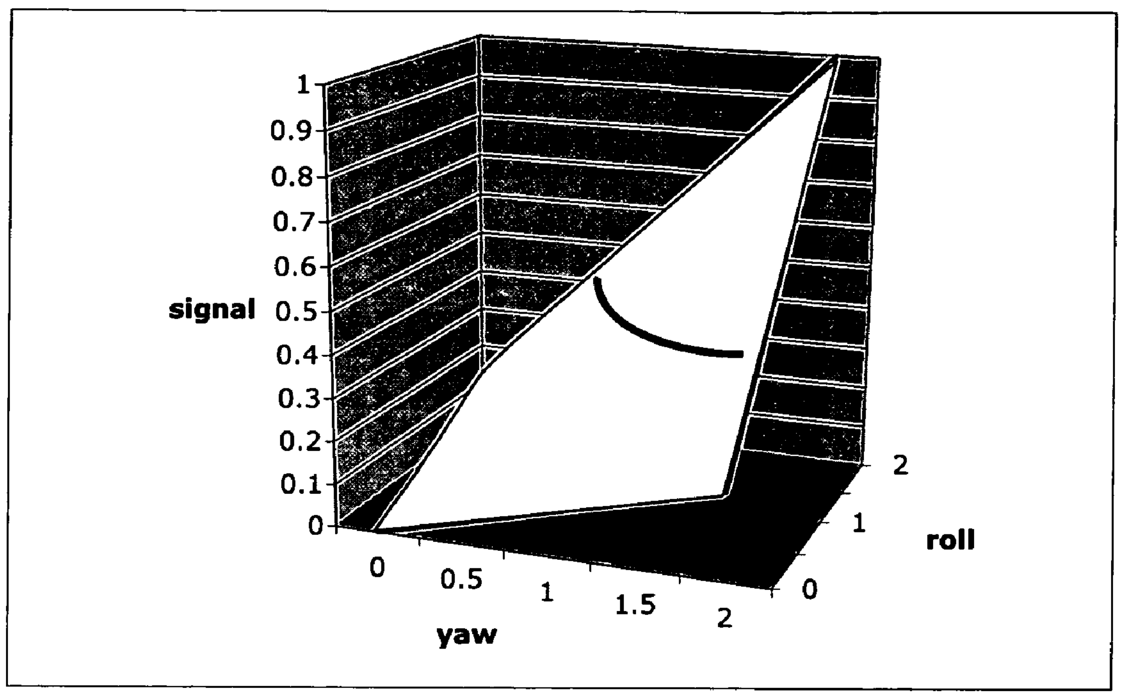
FIG. 6 is an illustration of a correlation contour on a correlation strength surface for a given target image and reference filter.
Figure 7:
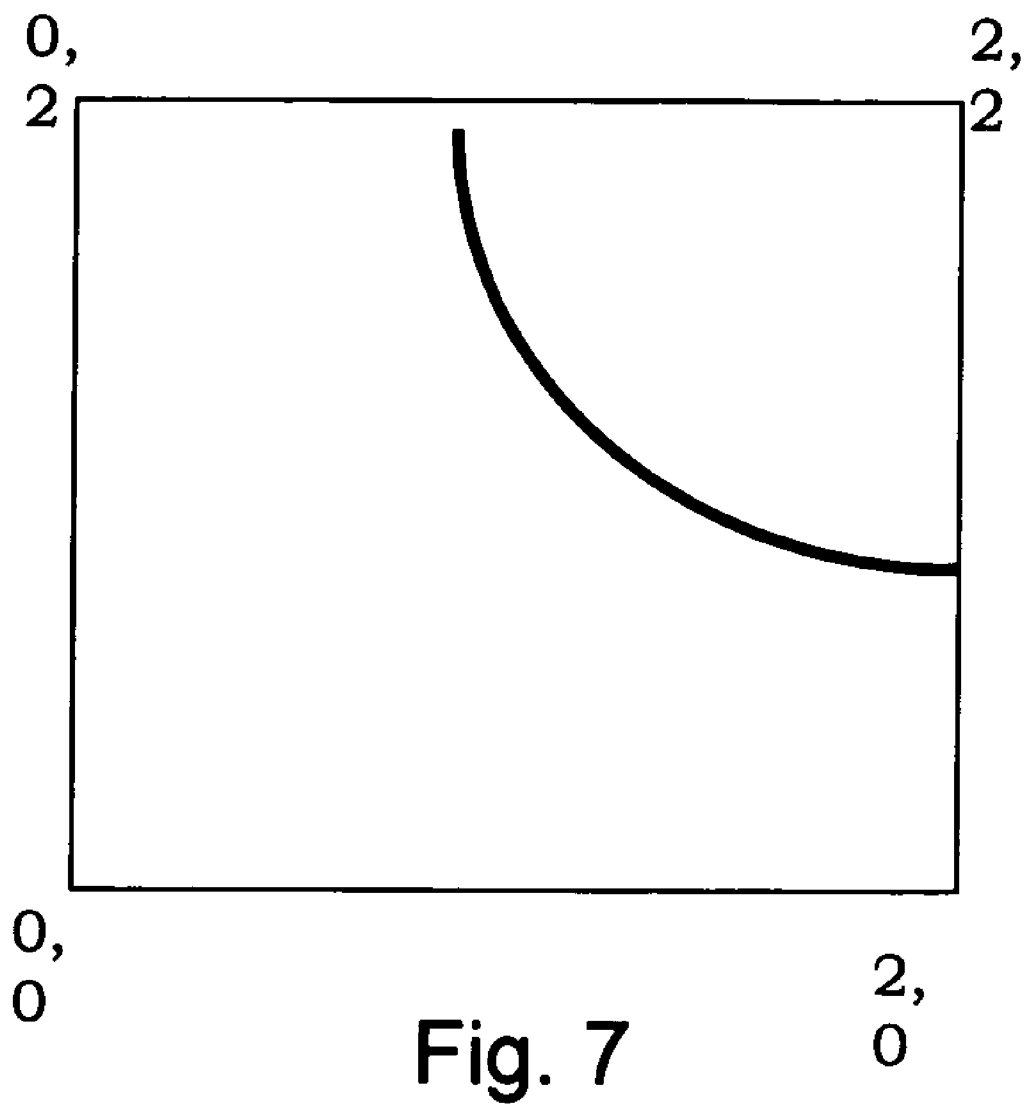
FIG. 7 is an illustration of a projection of the correlation contour of FIG. 6 onto a reference plane containing the yaw and roll axes of FIG. 6.
Figure 8:
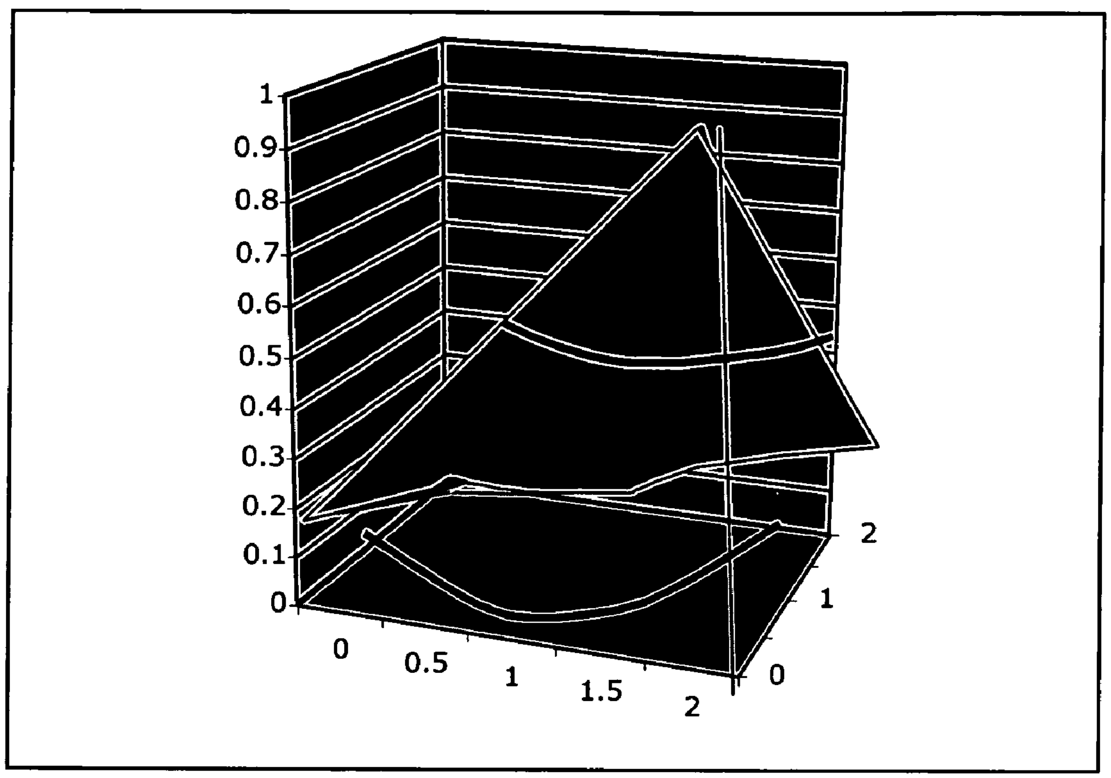
FIG. 8 is an illustration of a contour curve on a correlation strength surface for a reference filter for an roll, yaw aspect plotted at the lower right corner of the illustration, and also illustrates a projection of the contour curve onto a plane containing the reference axes for the correlation strength surface.
Figure 9:
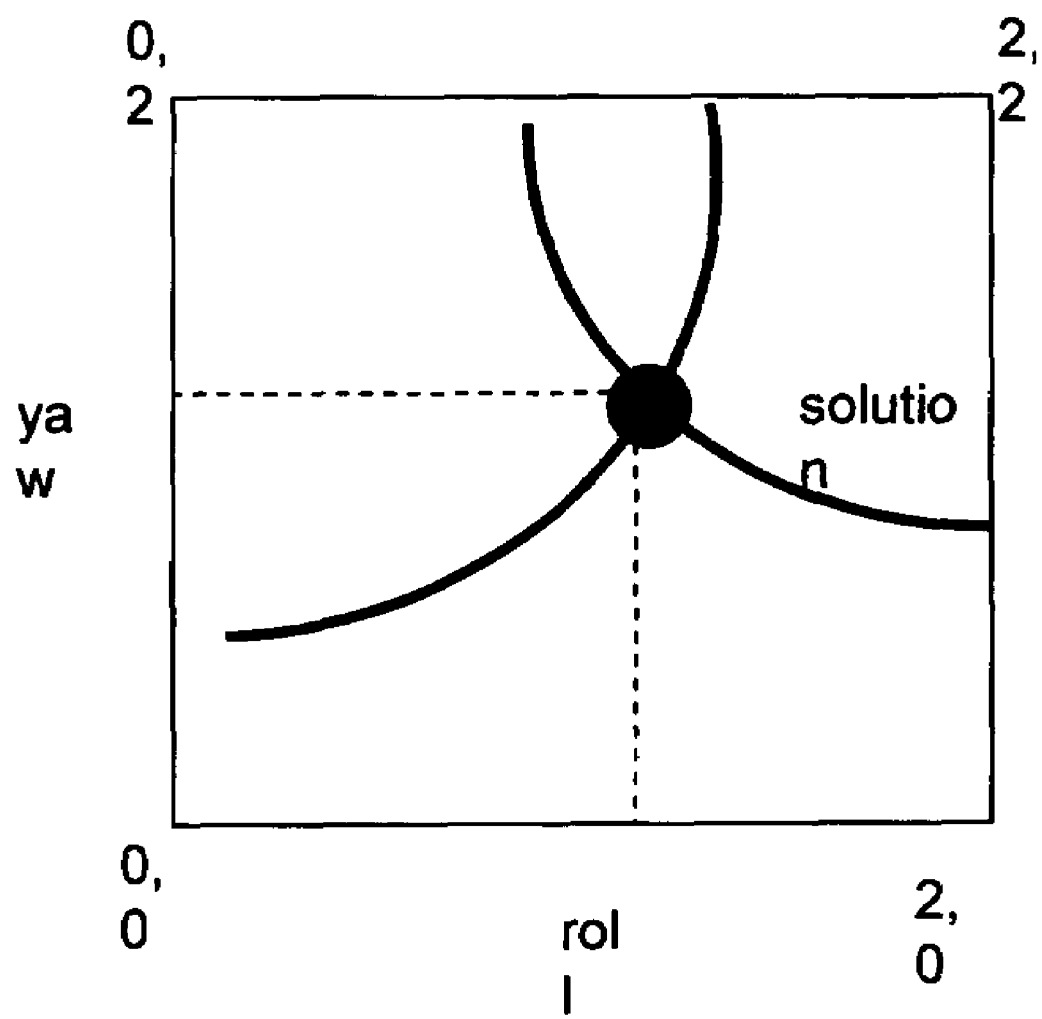
FIG. 9 is an illustration of an intersection of projections of correlation contours for correlations of a target image with two different reference filters at different aspects.

A sequence of operations shown in FIG. 5 illustrates how reference filters and associated correlation strength surface information generated during a training phase may be used in an application phase to provide a rapid and accurate estimate of object orientation with only a few reference filter correlations. At box 110, a current test image of a target is obtained, as by a video camera. This current test image is correlated at box 112 with each of the reference filters expected to be in, and preferably bounding, an aspect region of the target object aspect from which the test image was acquired. The correlation may be performed, for example, using an optical correlator, or via calculations, as disclosed in Applicants' patent application Ser. No. 10/831,587. Correlation strength measurements obtained from these correlations are stored in a manner that retains an association of each correlation strength measurement with its respective reference filter. At box 114, each correlation strength measurement may then be used in an expression defining the correlation strength surface for its respective reference filter in order to define a correlation contour for that test image and that reference filter. A correlation contour is generally a curve, as illustrated in FIG. 6, comprising points lying on a correlation strength surface where the signal value matches the correlation strength, also called correlation intensity, of the correlation of a test image with a given reference filter. A correlation contour may also be projected onto a plane of the reference axes for orientations being measured, as illustrated in FIG. 7. That contour on the 3-D plot is all the possible points of the solution of the dimensions (yaw and roll in this case), so the projection on the floor (z=0) plane, illustrated in FIG. 7, contains all possible solutions. Stated another way, an orientation solution for the target object will lie somewhere on that correlation contour for that filter. This process is repeated to obtain correlation contours for each of the other reference filters for the respective correlation strengths of their correlation with the test image. FIG. 8 illustrates a correlation contour, and its projection onto a plane of the reference axes, for correlation strength of the test image with another reference filter. For the reference filter of FIG. 8, a highest point in the correlation strength surface is toward the viewer. Again, the test image is correlated with the reference filter, and correlation strength of that correlation is used to create a contour line on this correlation strength surface, also called a training image surface. A projection of the resulting correlation contour is shown on a floor (z=0) plane. FIG. 9 illustrates that these two projections intersect at a point, and that point is, for this example, the roll-yaw solution. Note that two test measurements were made to get two results. If orientation of the target object is between aspects of reference filters used for the correlations, projected curves of correlation contours will generally intersect in a plane of the reference axes, and the point, as shown in FIG. 9, where they intersect is a solution for orientation angles represented in the particular reference axes (i.e., yaw and roll in the current example).

Figure 10:
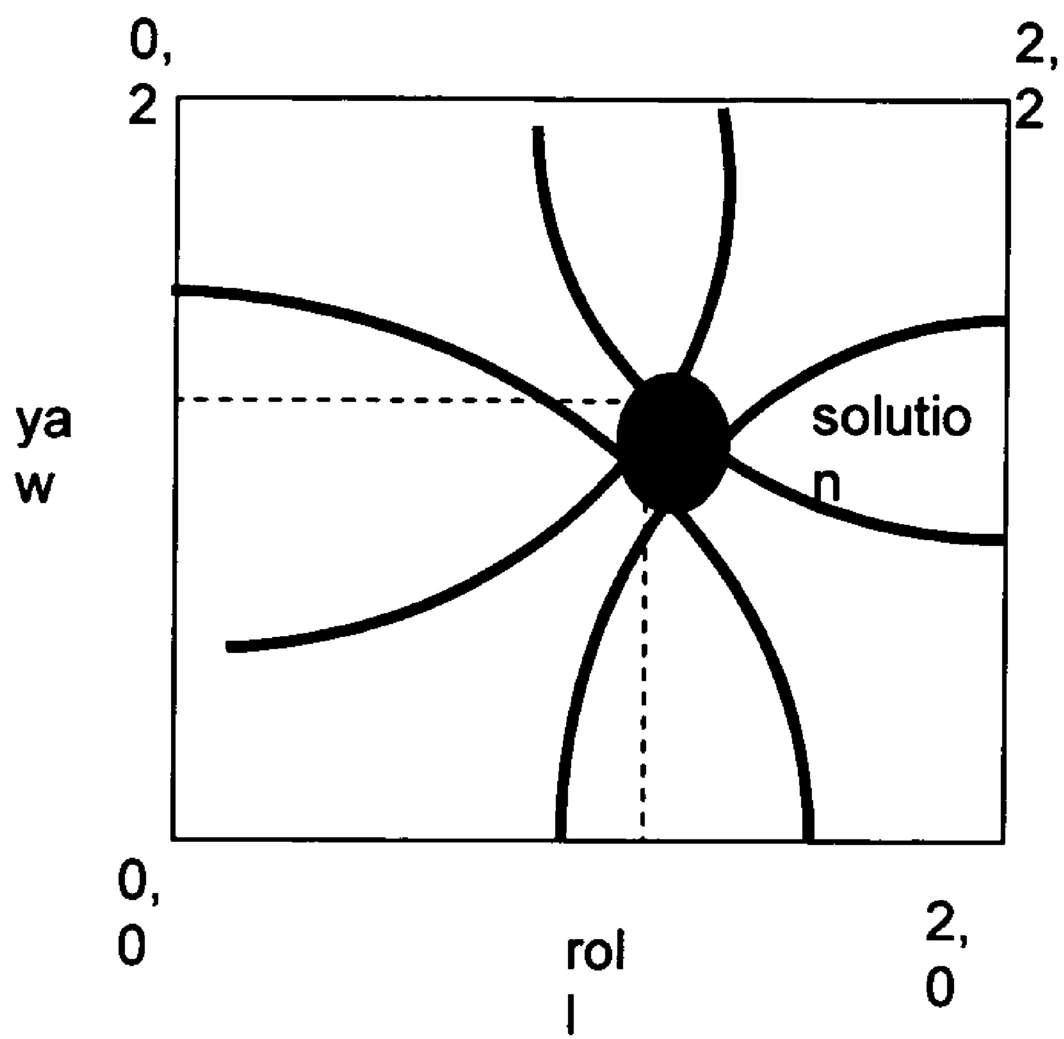
FIG. 10 is an illustration of projections of correlation contours for correlations of multiple reference filters with a target image, and shows how there may be uncertainty in a solution for target orientation.

As illustrated in FIG. 10, the process of box 114 involving correlation of a target image with additional reference filters, and determining correlation contours for each of these reference filters, may be repeated for additional reference filters. Here, correlation strength surface expressions for each reference filter are generated in a training phase by making correlation measurements between each reference filter and training images for, in this example, 16 positions of a training object. Each training image position is modified by some increment in a roll or yaw angle from a point used to generate the reference filter. Training data (i.e., correlation strength surface expressions) for at least three reference filter positions are needed to provide adequate performance in real world situations. In some instances, training data for four positions is desirable since comparison to four images could provide four curves for simultaneous solution, as shown at box 116, to find a new pose, or orientation, of the target, and in this case giving an estimate of circular error, as illustrated in FIG. 10.

Figure 11:
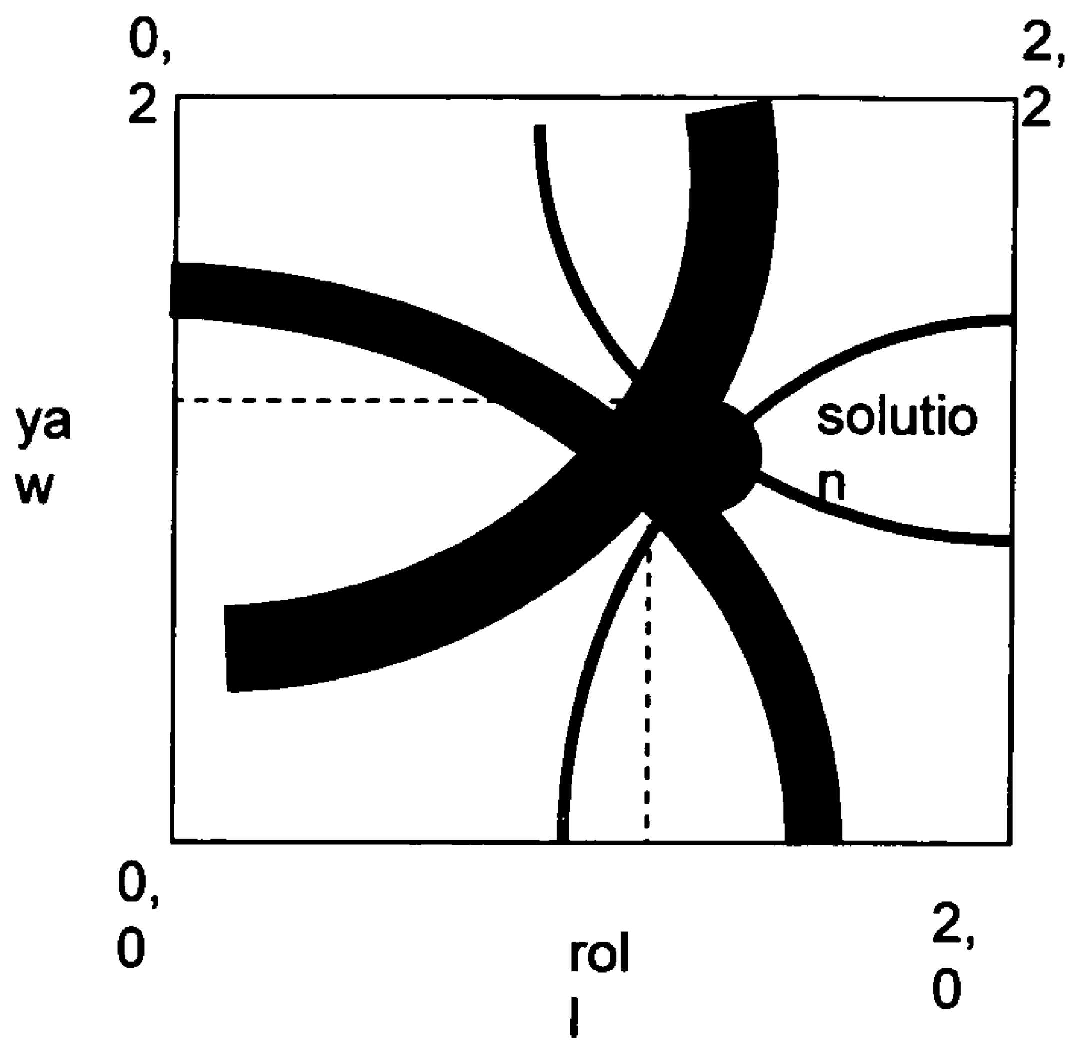
FIG. 11 is another illustration of projections of correlation contours wherein projection line width is widened to reflect increased uncertainty in correlation contour position due to lower signal to noise ratios for correlations of a target image with certain reference filters.

In practice of the invention, signal to noise ratio of correlation peaks resulting from correlations of a test image with some reference filters may be poorer than a signal to noise ratio from correlations with other reference filters, so correlation contours resulting from these low signal to noise correlations, represented by broader lines to represent greater uncertainty in FIG. 11, may either be ignored or carry less weight in a solution of simultaneous equations to determine target orientation.

Note that in the equation:

$$Z=c+a_1X+b_1Y+a_2X^2+b_2Y^2+a_3X^3+b_3Y^3+ \cdots \quad (1)$$

correlation of a test image with a reference filter provides a value for Z (i.e., correlation strength) for determining a correlation contour for that reference filter. The parameters $a_i$, $b_i$, and $c$ are determined during a training phase using conventional curve fitting techniques, using correlation strength results of correlations of images of the reference object from different aspects, also called training images, so the equation can be solved for a form of x vs y.

The instant invention employs simultaneous equations, which may be in a form of:

$$Z_1=c+a_{11}X+b_{11}Y+a_{12}X^2+b_{12}Y^2+a_{13}X^3+b_{13}Y^3+ \cdots \quad (2)$$

$$Z_2=c+a_{21}X+b_{21}Y+a_{22}X^2+b_{22}Y^2+a_{23}X^3+b_{23}Y^3+ \cdots \quad (3)$$

$$Z_1=c+a_{31}X+b_{31}Y+a_{32}X^2+b_{32}Y^2+a_{33}X^3+b_{33}Y^3+ \cdots \quad (4)$$

$Z_4$ etc.

where Z is the correlation strength for filter j and a and b are coefficients derived during training.

Once correlation signal strength results from correlations of a test image of a target object are used to provide values of Z for each respective reference filter, these equations may be solved for values of X and Y. There are several ways of solving this numerically; for example, the simplex method, but other known solution techniques may also be used. Also, as noted earlier, other expressions such as other expansion series may also be used to describe a correlation strength surface for each reference filter.

In an embodiment that includes a tracking capability, a target pose estimate obtained at box 116 (FIG. 5) may be used at box 118 separately, or together with previous measurements, to obtain an estimate of a new target pose or orientation for a future target image so that suitable filters may be selected for use in refining an evaluation of target orientation at the future measurement time. At box 120, a decision is made whether to continue a tracking process that, if affirmative, results in control looping back to box 110 so that another image of a target object may be obtained.

In the real world, correlation signal strength is not an absolute. (However, it should be noted that some software packages make it appear to be so, as for example implementing a normalizing process such that a correlation peak is always set to 1). Correlation signal strength is variable, and can change with camera settings, illumination, the paint on a target or other variables. Where an infra-red sensor or camera is used, correlation signal strength can vary with temperature and emissivity of paint or surface material.

Consequently, it is normally desirable to use at least one or more extra measurements using additional reference filter locations, beyond the measurements using three reference filter positions essential to establish orientation in most real-world applications, to normalize the correlation values. There are a variety of ways of doing this. For example, one could multiply each test result by 4/Σ (test correlation results), but other normalization techniques may also be used.

Another normalization technique is suggested by earlier work by Applicants on using multiple filters to detect range using a discriminate curve, where the curve was developed from two training sets:

$$D = \frac{S_1(r) - S_2(r)}{S_1(r) + S_2(r)} \quad (6)$$

The same equation was applied to the two test measurements, resulting in a single test number, which gave a result for range r on the D=f(r) curve. This same equation and approach may also be used to provide a form of normalized interpolation for orientation angles using correlation strength results for reference filters that bracket a true orientation angle (e.g., yaw) of a target object. The best approach will likely vary with the specific application.

A normalized correlation strength surface may be both positive and negative. An interesting factor here is that with 4 data points, there are now 6 possible discriminant surfaces (1-2, 2-3, 3-4, 4-1, 1-3, 2-4). There is obvious redundancy, which may be exploited for additional insight into quality of an estimate or other information.

As noted earlier, a complete, normalized solution can be achieved for a 2 degree of freedom problem using correlations with three filters. A 2-degree of freedom solution that uses four filters, and weights the effects of signal strength, will generally yield greater accuracy.

Application of the correlation strength surface method of the instant invention to 3 degree of freedom and 4 degree of freedom applications is an extension of the method described above. It is difficult to visualize the more complete real world case of 3 degrees of freedom (roll, yaw, and pitch), where signal strength is now a fourth dimension. For an application involving 3 degrees of freedom, four measurements suffice, but additional correlation strength measurements with other reference filters, e.g., 8, may provide greater accuracy and better estimate of potential errors.

Although this condition is hard to visualize, the mathematics are similar to that described earlier herein, but with addition of another index.

If one wishes to add range to the same solution, rather than dealing with it independently, there are four dimensions of solution space, and the signal strength may be a fifth dimension. In this case, one has what some have referred to as a data teseract.

The form of equations for higher degrees of freedom is amenable to a matrix or tensor solution approach. For example:

roll, yaw vector(2)=surface matrix(2×4)$X$ test measurement vector(4). (7)

There is a significant parallel here to the calculation typically used for a quad detector. The parallel is that one may add the sum of correlation signal strengths for a given target image with reference filters corresponding to coordinate frame locations (0,0) and (0,1) minus the sum of correlation strength measurements with reference filters corresponding to coordinate frame locations (1,0) and (1,1), divided by the sum of the four correlation strength measurements, to get one parameter. A similar calculation may then be performed combining sums for positions (0,0) and (1,0) minus sums for positions (0,1) and (1,1), divided by the sum of the four correlation strength measurements to get the other parameter. This approach may then yield an approximate solution.

As noted earlier, it is possible to lessen sensitivity of a matched filter to a variable, such as one of the degrees of orientation, by using a multiplexed filter, also referred to and described in the literature as a composite filter (e.g., see Kumar—Tutorial survey of composite filter designs for optical correlators, already referenced earlier and incorporated herein by reference in its entirety), using a variety of views of the subject. One technique for developing a composite filter with reduced sensitivity to one orientation direction has been described earlier, and other techniques are discussed in the referenced paper by Kumar).

Figure 12A:
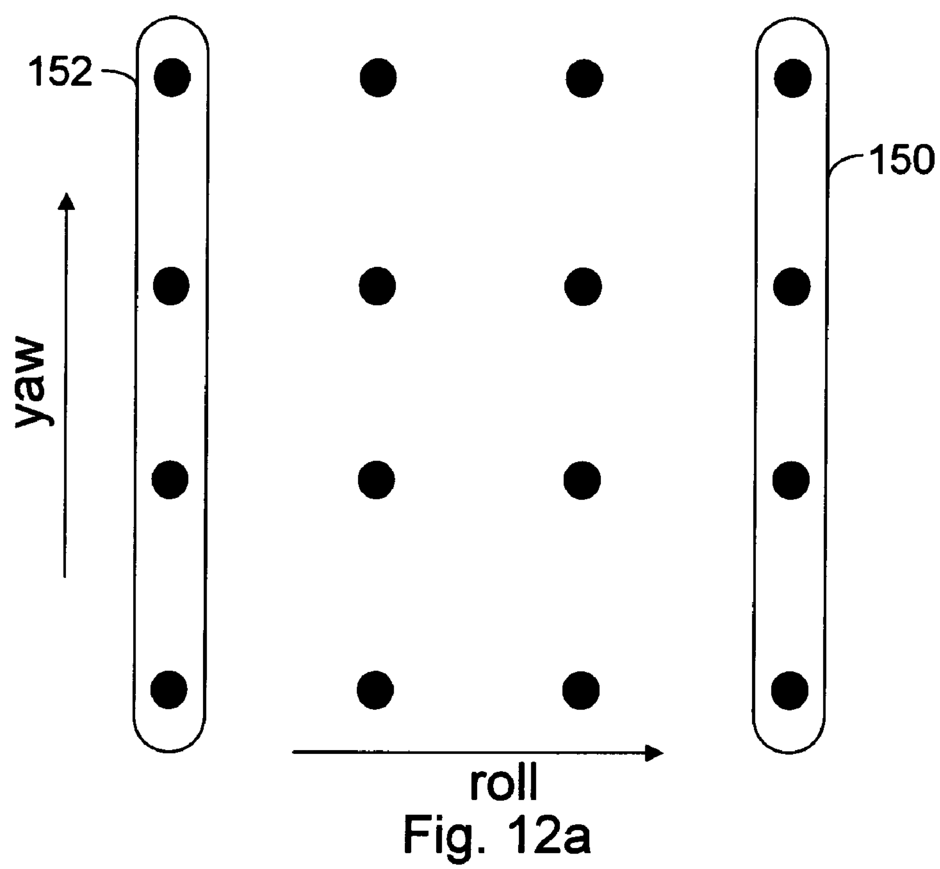
FIGS. 12*a* and 12*b* illustrate how images may be selected for inclusion into composite filters to reduce sensitivity of the filter to changes in certain orientation axes.
Figure 12B:
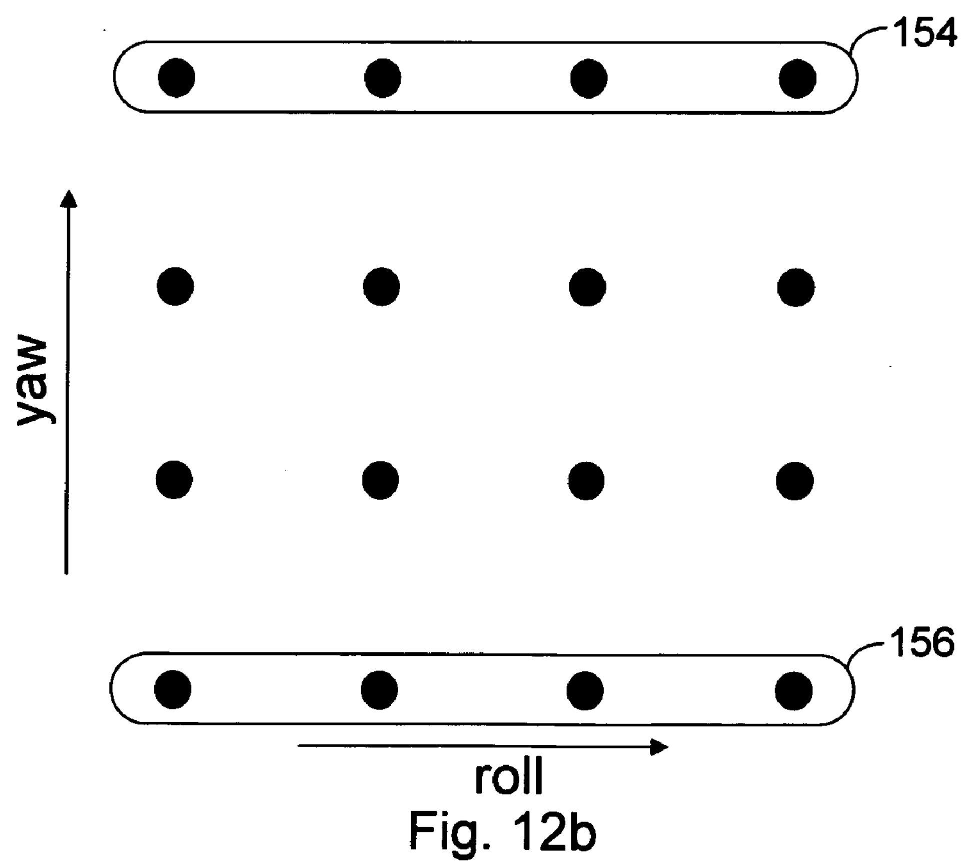

In a second method for remotely measuring orientation of an object, Applicants' invention includes creating multiplexed, composite filters which retain correlation strength sensitivity to changes in one degree of freedom, but have reduced sensitivity to changes in other degrees of freedom. Referring to FIGS. 12*a* and 12*b*, where the dots represent a grid, in yaw and roll directions, of training images taken (e.g., at box 140 of FIG. 13) at incremental offsets in yaw and roll from some aspect. Selected image groups 150, 152 from this grid are used to create composite reference filters which have reduced sensitivity to changes in yaw, and other image groups 154, 156 are used to create other composite reference filters that have reduced sensitivity to changes in roll. As was noted earlier herein, one technique for creating such composite reference filters is to calculate a 2-dimensional inverse Fourier transform for each image in a group, then use complex arithmetic to create a sum of the individual 2-dimensional Fourier transforms for that group into one two dimensional array, and then calculate a complex conjugate for that summation array to create a reference filter. Such a filter will generally retain some sensitivity to changes in directions of reduced sensitivity, typically exhibiting smaller local maxima in correlation strength at the aspect of each image used to create the filter (hence the term "multiplexed filter"), but the overall change in sensitivity (i.e., correlation strength response) to aspect changes in those directions is typically greatly reduced. As noted earlier, other techniques for generating composite filters, such as those described by Kumar (referenced earlier herein) may also be used. A capability to create such composite reference filters provides a tool that may be used to at least partially decouple effects, in the present example, of changes in yaw from changes in roll, so that yaw and roll angles may be measured independently, to a large degree. Illustrations of reduced sensitivity of composite filters in selected directions, when compared to single point filters, are provided later herein.

This capability to create reference filters with selectively reduced sensitivities in aspect is used in a second method for developing a refined estimate of target orientation with fewer reference filters and fewer measurements being needed to determine a target object orientation during an application phase of the method. As can be seen from FIGS. 12*a* and 12*b*, composite reference filters may be created from reference image aspects selected to bracket those aspects from which a target object may be viewed and imaged in a given application phase. Such filters may then be used in an application phase of the method to support relatively independent interpolations, for this example in roll and yaw directions, to develop a more accurate estimate of target object orientation, for those directions, based on correlations with fewer reference filters.

In one technique for using such filters, an image of a target object obtained during an application phase may be correlated with each of the four composite reference filters described above, to obtain a separate correlation strength result for each correlation. These correlation strength results may then be used to calculate normalized interpolations, for roll and yaw, using equations such as the following:

$$\text{Yaw} = \frac{\text{peak}_{154}(y, r) - \text{peak}_{156}(y, r)}{\text{peak}_{154}(y, r) + \text{peak}_{156}(y, r)} \tag{8}$$

$$\text{Roll} = \frac{\text{peak}_{150}(y, r) - \text{peak}_{152}(y, r)}{\text{peak}_{150}(y, r) + \text{peak}_{152}(y, r)} \tag{9}$$

where $\text{peak}_{154}(y,r)$ is the correlation strength (i.e., peak) resulting from a correlation of an image of a target object (e.g., during an application phase) with a composite reference filter developed from image group 154 (reference FIG. 12*b*), $\text{peak}_{156}(y,r)$ is the correlation strength resulting from a correlation of the same image of the target object with the composite reference filter developed from image group 156, and $\text{peak}_{150}(y,r)$ and $\text{peak}_{152}(y,r)$ have similar meaning for correlations using filters developed from image groups 150 and 152, respectively. Using conventional linear interpolation techniques, results from equations (8) and (9) represent the estimated orientation of the target object as a fractional distance between the bracketing yaw or roll aspects, respectively, used for the reference filters and hence for the interpolation. Consequently, as in conventional linear interpolation, this fractional result times the yaw or roll distance, respectively, between the bracketing values must be added to the base yaw or roll value to determine actual yaw or roll position in the coordinate system used for generation of the filters and the correlations. This interpolation technique may be extended to encompass additional filters at other aspects to perform higher order interpolations where warranted for a particular application.

Figure 13:
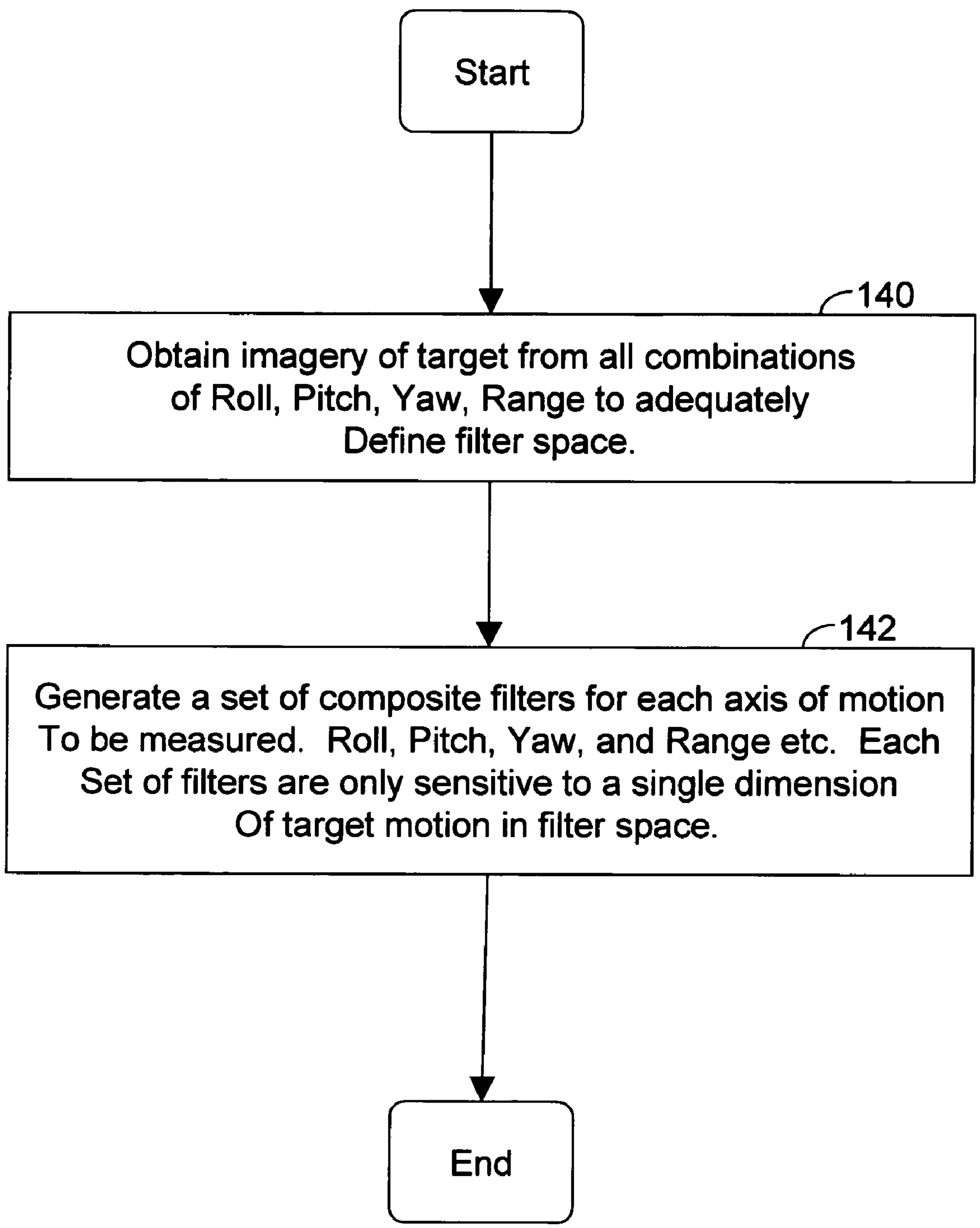
FIG. 13 is a flowchart providing an overview of a training phase of an interpolation method using composite filters for determining orientation of a target object.
Figure 14:
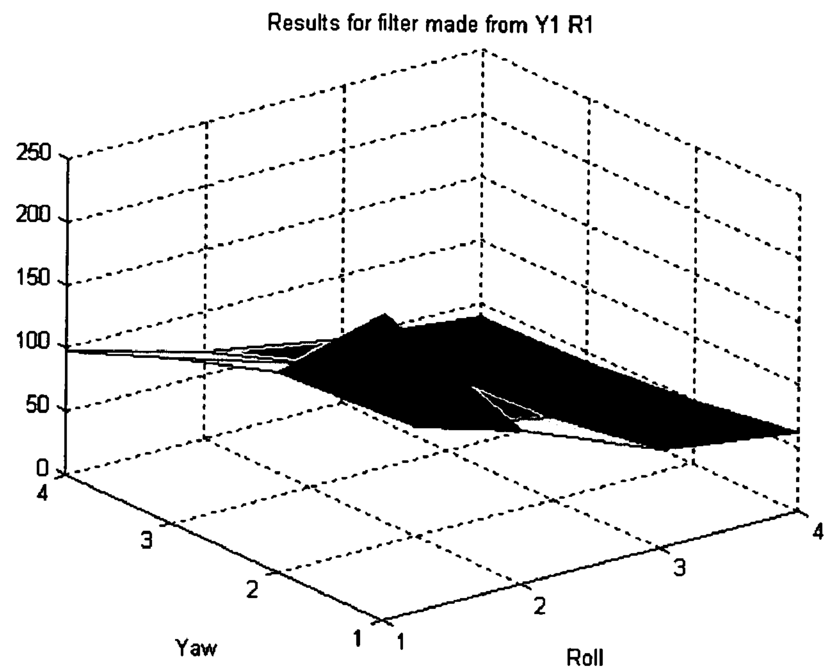
FIG. 14 is an illustration of a correlation strength surface for correlations of training images at different aspects with a reference filter developed for an aspect located at the front center position of the plane containing the yaw and roll reference axes.
Figure 15:
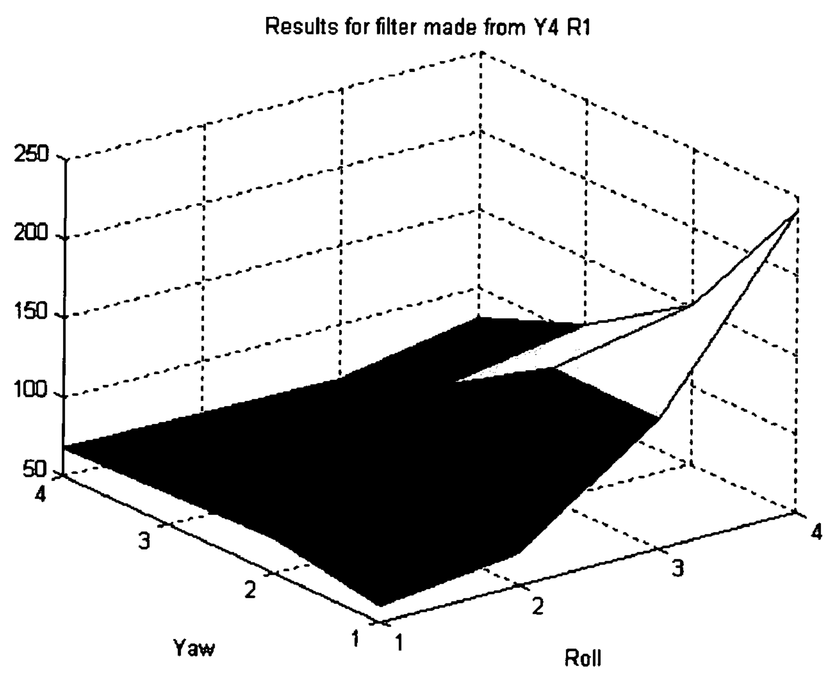
FIG. 15 is an illustration of a correlation strength surface for correlations of training images at different aspects with a reference filter developed for an aspect located at the right corner position of the plane containing the yaw and roll reference axes.
Figure 16:
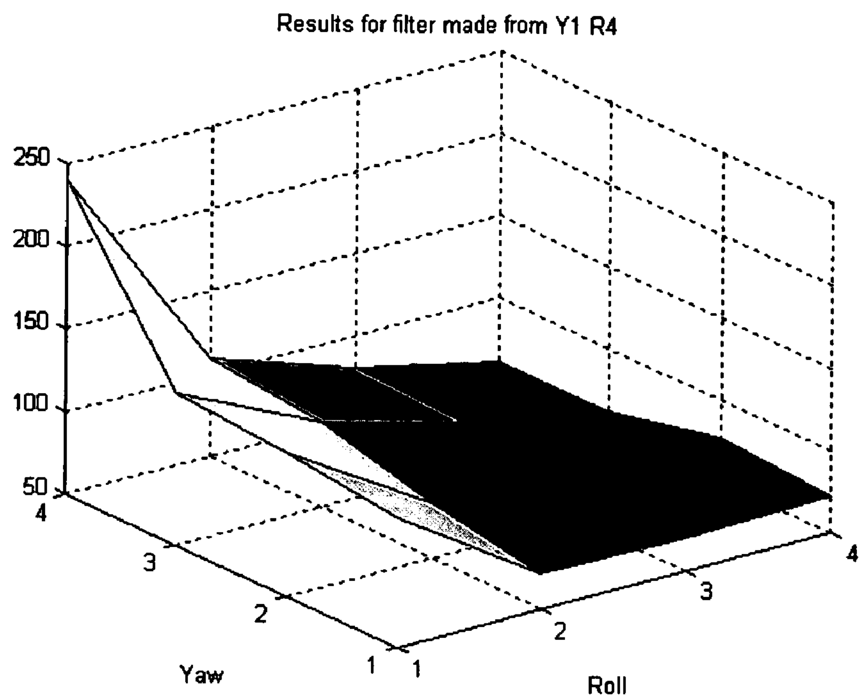
FIG. 16 is an illustration of a correlation strength surface for correlations of training images at different aspects with a reference filter developed for an aspect located at the left corner position of the plane containing the yaw and roll reference axes.
Figure 17:
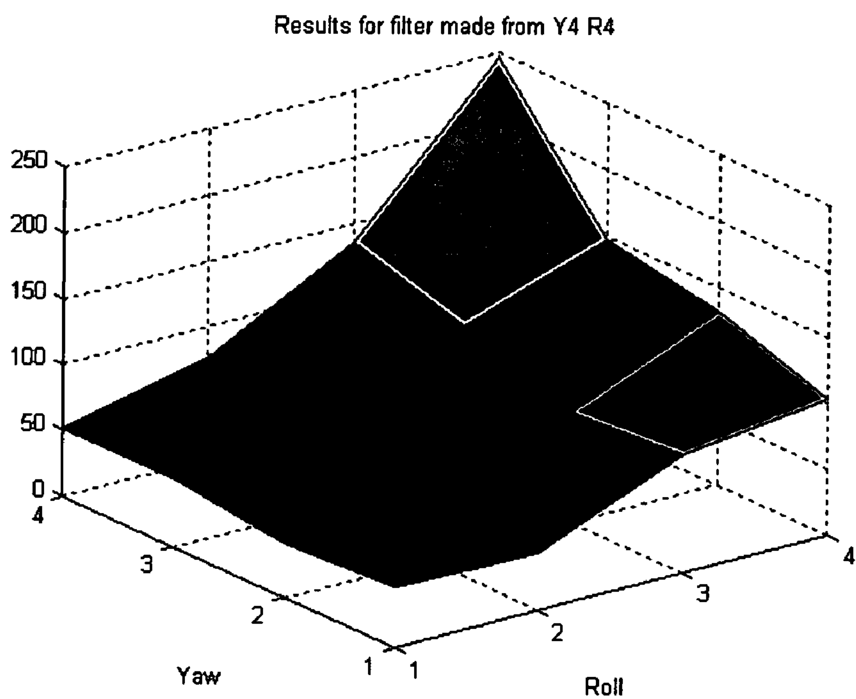
FIG. 17 is an illustration of a correlation strength surface for correlations of training images at different aspects with a reference filter developed for an aspect located at the rear center position of the plane containing the yaw and roll reference axes.
Figure 18:
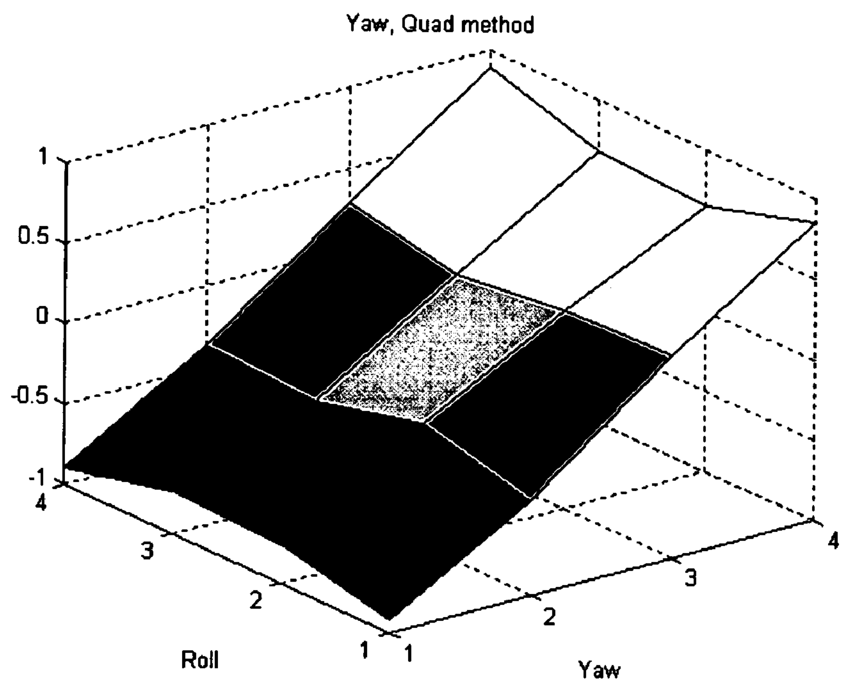
FIG. 18 is an illustration showing how correlation strength varies between yaw aspects for which filters are developed when such filters are correlated with training images, with results (vertical axis) normalized to represent the difference, in degrees, between yaw aspects used for the composite filters.
Figure 19:
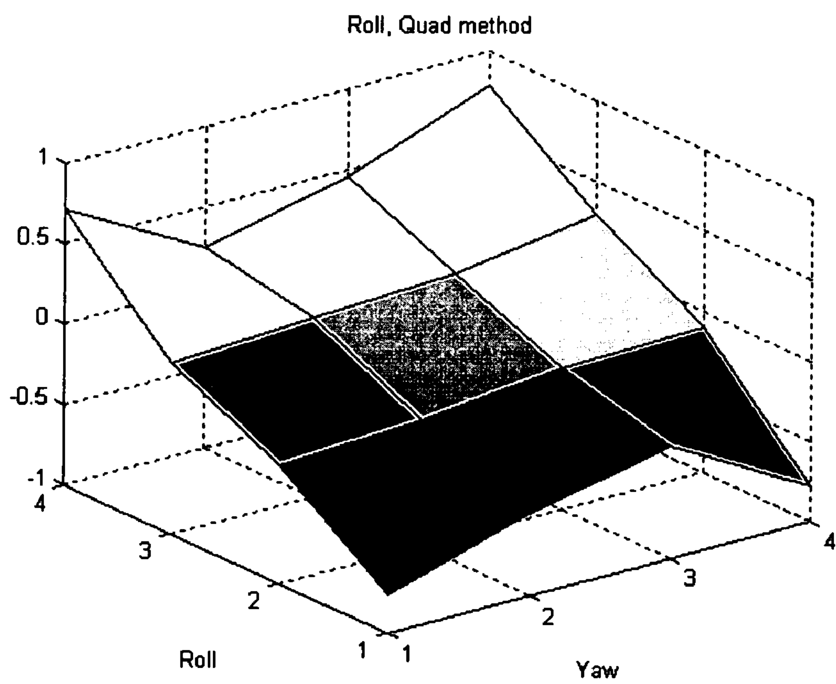
FIG. 19 is an illustration showing how correlation strength varies between roll aspects for which filters are developed when such filters are correlated with training images, with results (vertical axis) normalized to represent the difference, in degrees, between roll aspects used for the composite filters.
Figure 20:
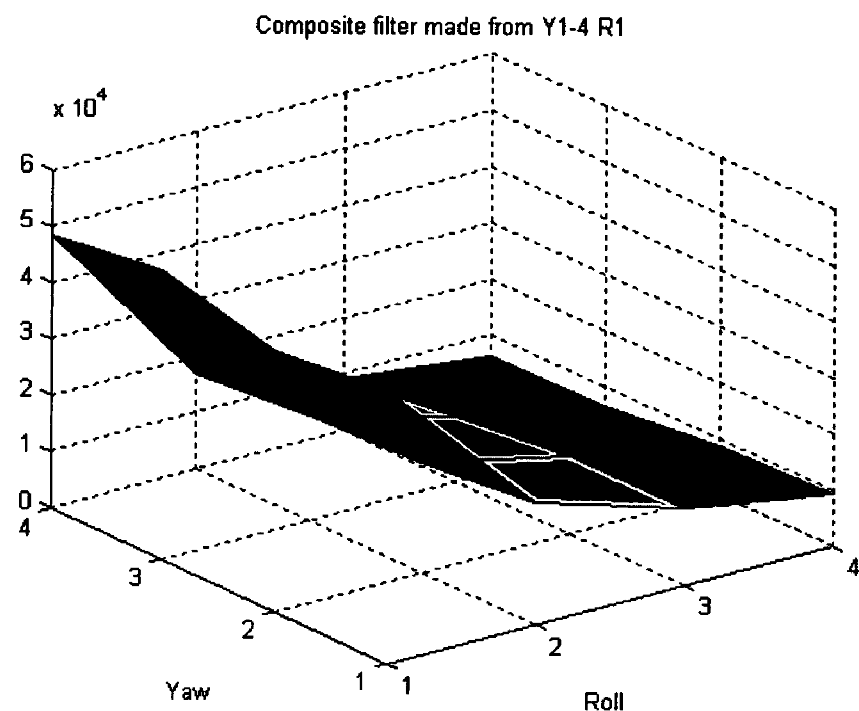
FIG. 20 is an illustration showing how correlation strength varies when training images at various roll and yaw positions are correlated with a composite reference filter created using images at multiple yaw positions along a single roll position (Roll position 1).
Figure 21:
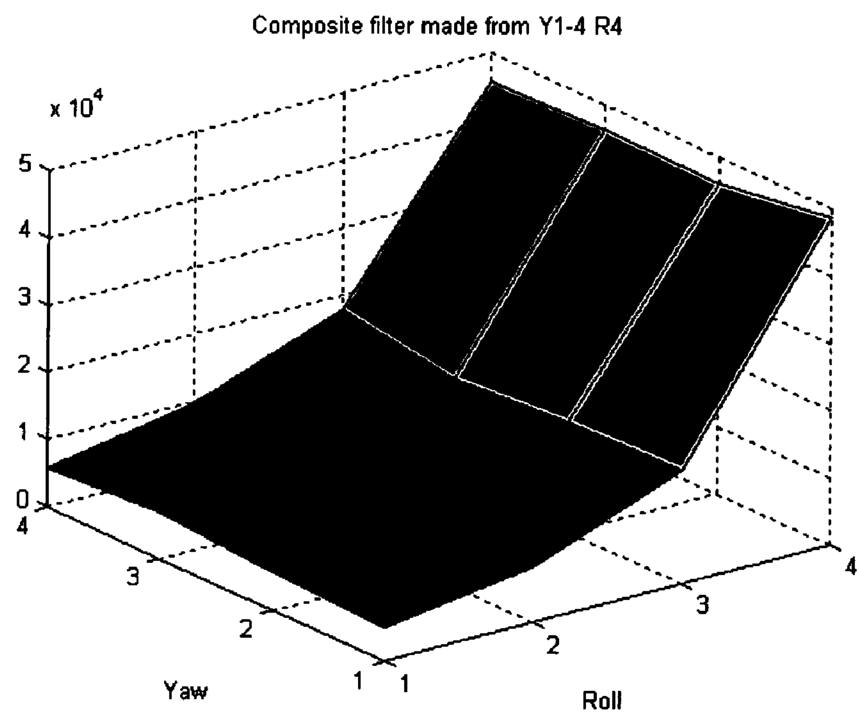
FIG. 21 is an illustration showing how correlation strength varies when training images at various roll and yaw positions are correlated with a composite reference filter created using images at multiple yaw positions along a different single roll position (Roll position 4).
Figure 22:
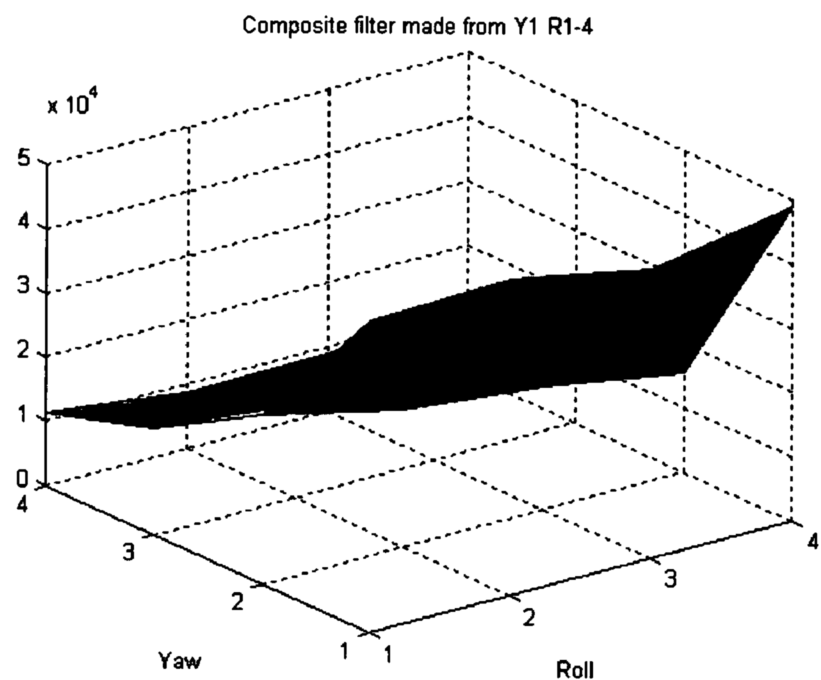
FIG. 22 is an illustration showing how correlation strength varies when training images at various roll and yaw positions are correlated with a composite reference filter created using images at multiple roll positions along a single yaw position (Yaw position 1).
Figure 23:
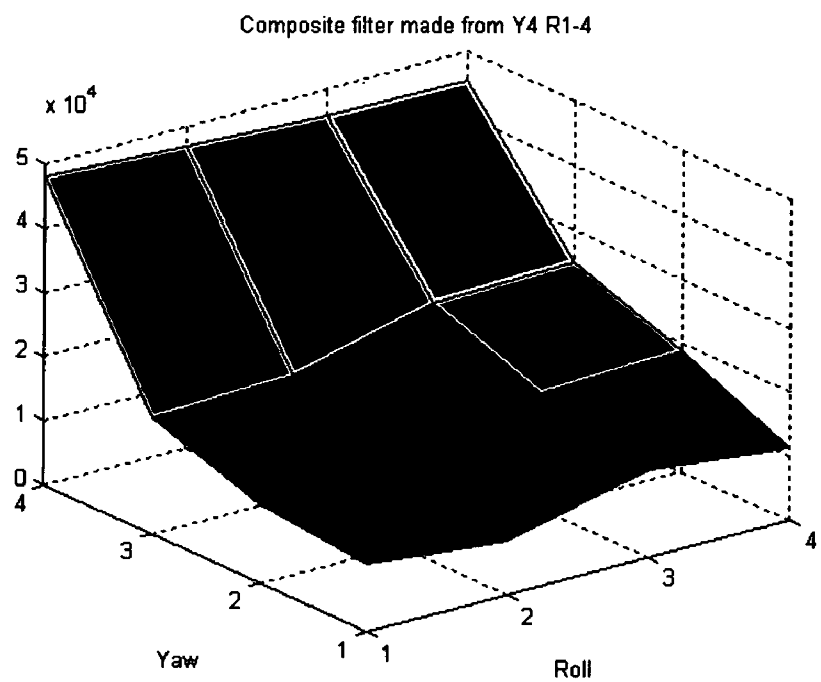
FIG. 23 is an illustration showing how correlation strength varies when training images at various roll and yaw positions are correlated with a composite reference filter created using images at multiple roll positions along a single yaw position (Yaw position 4).

FIG. 13 provides an overview of steps in a training phase of this second method. The examples used herein are for roll and yaw, but the invention applies equally well to pitch and range, to any combination of these, and to extension to three and four, or even more, degrees of freedom. At box 140 of FIG. 13, reference images are obtained, e.g., using techniques described earlier herein for the first method, for all combinations of roll, pitch, and yaw needed to encompass an extent of orientations for which measurements are desired during an application phase of this method. Reference images may also be obtained at selected increments, e.g., 5, 1, or 0.5 degrees, depending upon desired resolution in an application phase, between maximum extents in each orientation (e.g., yaw, roll, pitch).

At box 142 of FIG. 13, groupings of reference images at selected aspects, of constant yaw or constant roll in this example, and preferably being aspects that bracket orientation aspects of interest in a given application, are used to create composite filters with reduced sensitivity in yaw or roll, respectively, using a technique described earlier, or another technique from the literature (e.g., from Kumar). These filters are then stored for subsequent use during an application phase of this method.

Figure 24:
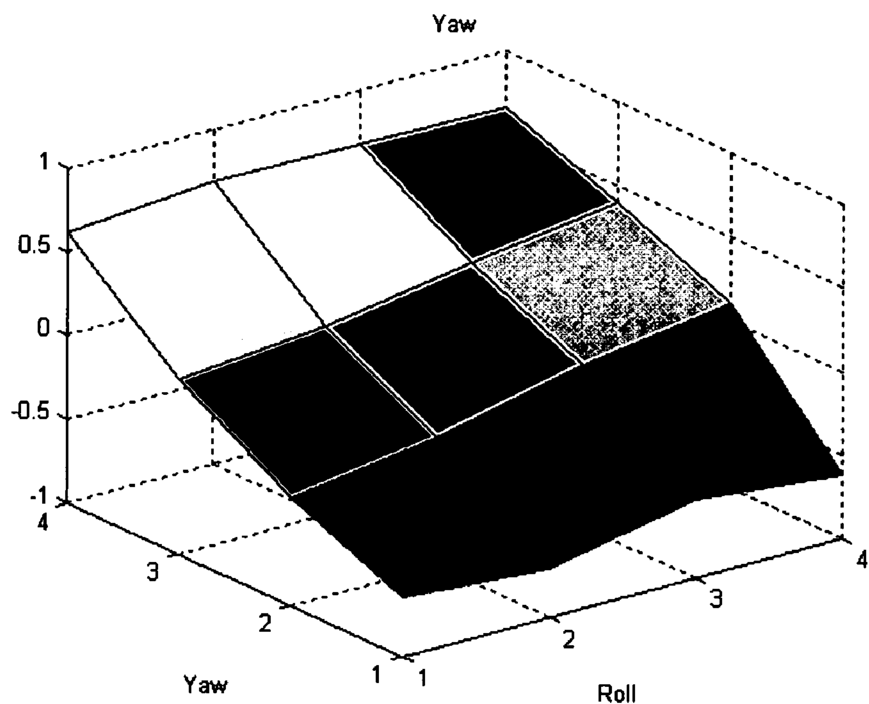
FIG. 24 is an illustration showing normalized results of interpolations of yaw positions for correlations of training images with a pair of roll-insensitive composite filters made for yaw positions 1 and 4.
Figure 25:
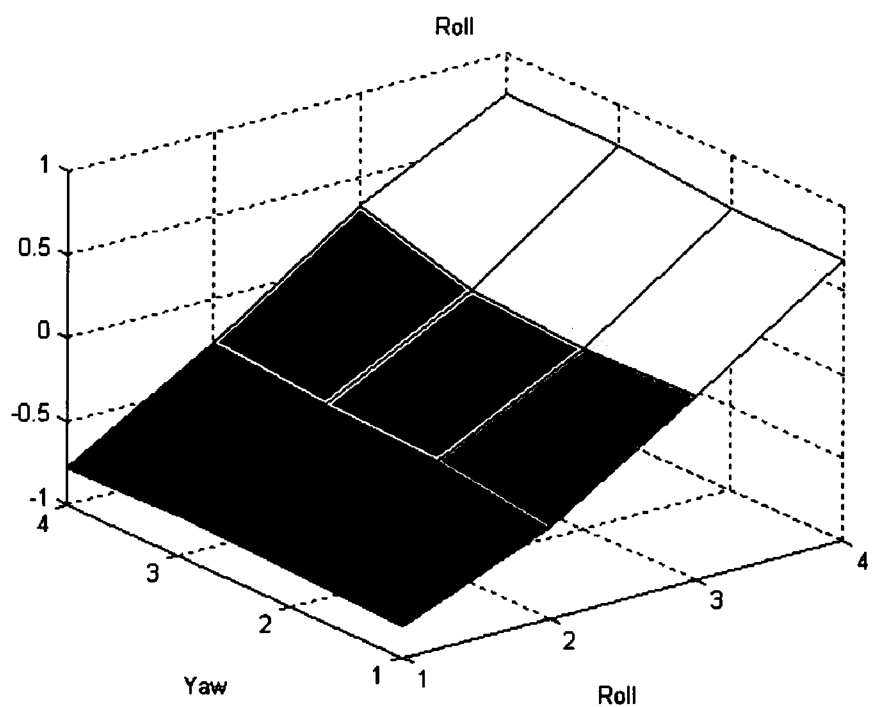
FIG. 25 is an illustration showing normalized results of interpolations of roll positions for correlations of training images with a pair of yaw-insensitive composite filters made for roll positions 1 and 4.
Figure 26:
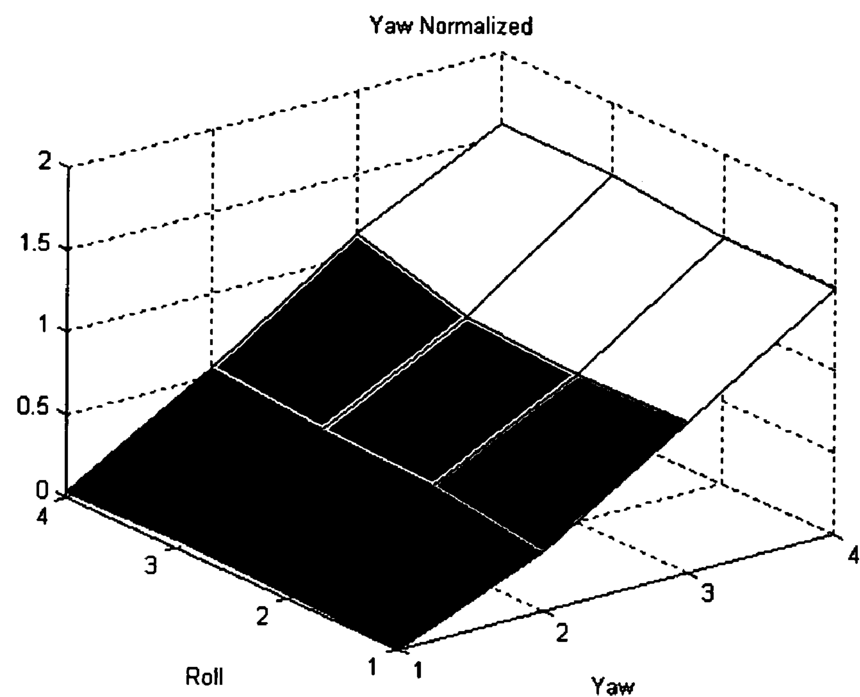
FIG. 26 is an illustration showing normalized and scaled interpolation results for yaw made for correlations of multiple training images with roll-insensitive composite filters made for yaw positions 1 and 4.
Figure 27:
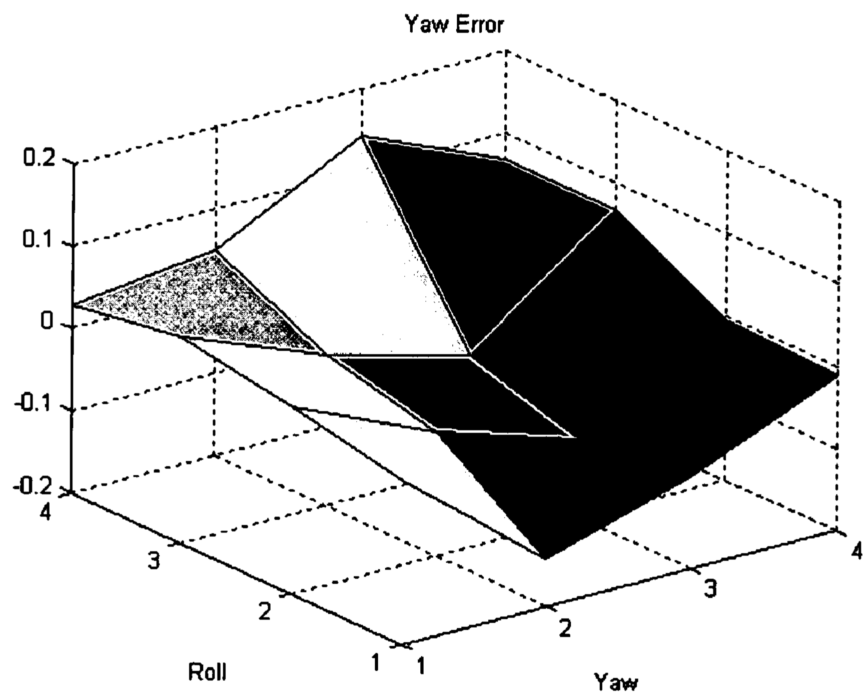
FIG. 27 is an illustration showing error, in terms of degrees on the vertical axis, when yaw positions predicted by interpolation, as in FIG. 26, are compared with known yaw positions for each training image.
Figure 28:
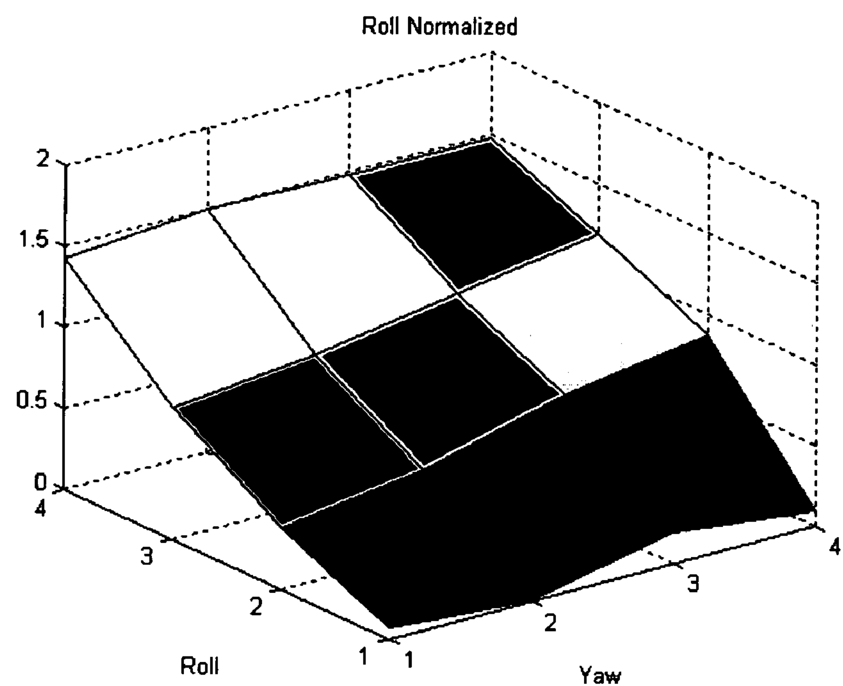
FIG. 28 is an illustration showing normalized and scaled interpolation results for roll made for correlations of multiple training images with yaw-insensitive composite filters made for roll positions 1 and 4.
Figure 29:
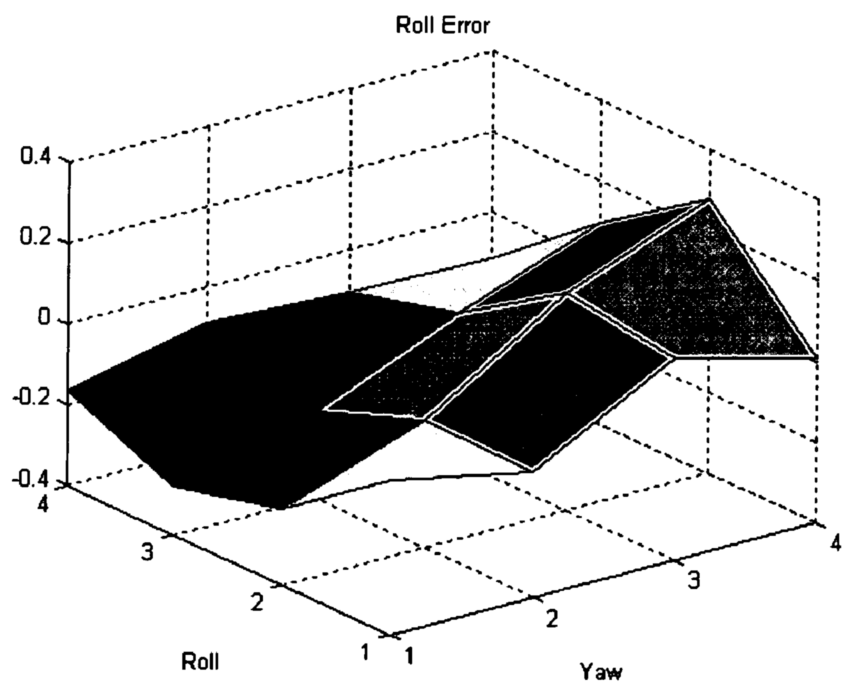
FIG. 29 is an illustration showing error, in terms of degrees on the vertical axis, when roll positions predicted by interpolation, as in FIG. 28, are compared with known roll positions for each training image.

In order to further illustrate use of filter generation and correlation and interpolation techniques described above, a series of illustrations from the example discussed earlier are included. FIGS. 14 through 17 illustrate correlation results, with training images, for individual filters developed from images at aspects which are at corners of the yaw-roll grid shown in FIGS. 12*a* and 12*b*, and FIGS. 19 through 23 illustrate correlation results, with training images, of composite filters created as described earlier herein. FIG. 24 illustrates normalized results of correlations of training images with filters described in FIGS. 22 and 23 developed for yaw-insensitive interpolations, and FIG. 25 illustrates normalized results of correlations of training images with roll-insensitive filters developed for yaw-direction interpolations. FIG. 26 illustrates normalized results of correlations scaled to degrees, with training images, of the roll-insensitive filters, and FIG. 27 illustrates error in interpolated yaw estimates made with these filters compared with known yaw positions of training images. FIG. 28 illustrates normalized correlation results scaled to degrees with training images of yaw-insensitive filters, and FIG. 29 illustrates errors in roll predictions made with these filters compared to known roll positions of training images.

Figure 30:
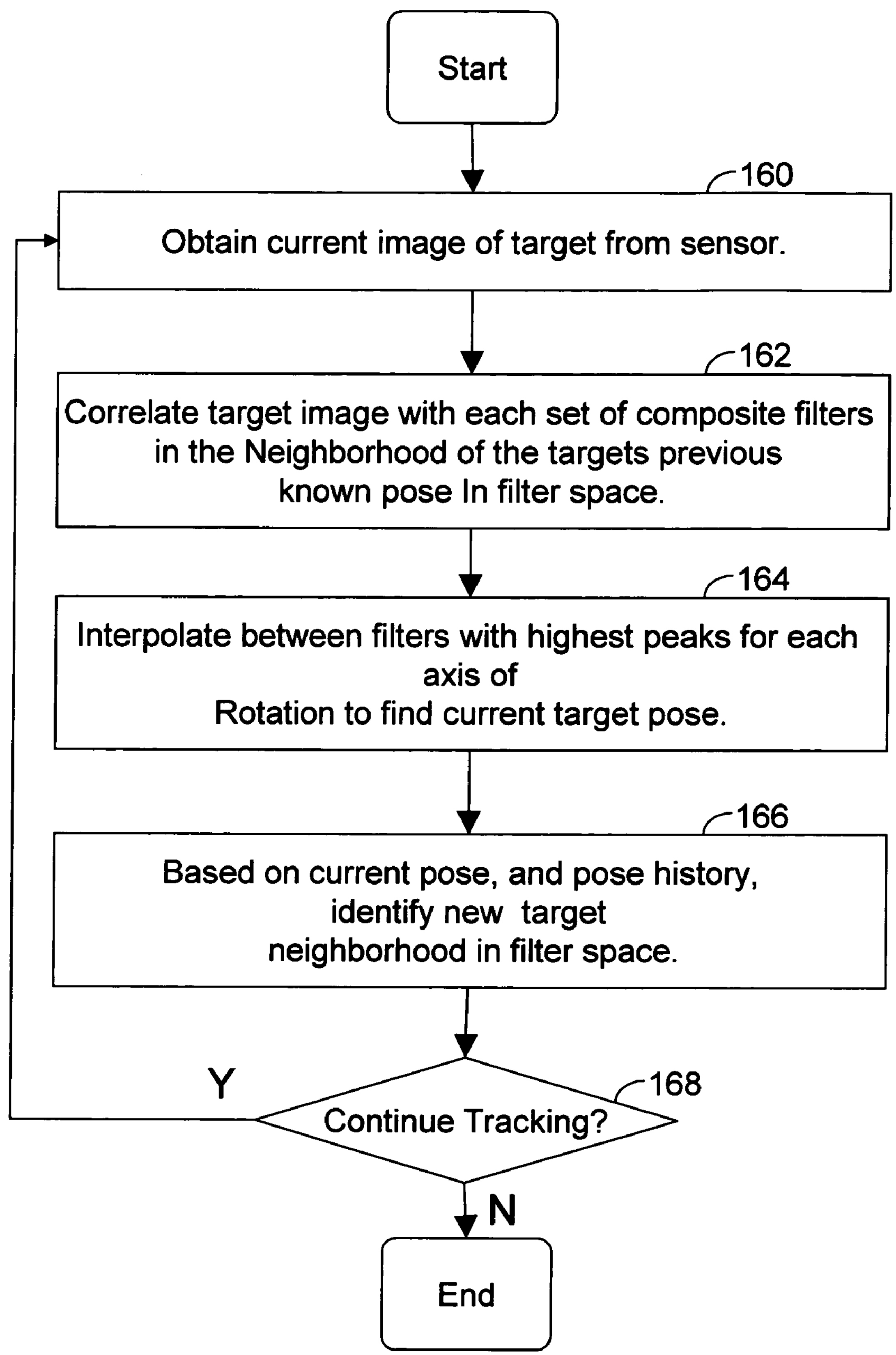
FIG. 30 is a flowchart providing an overview of steps during an application phase of an interpolation method using composite filters for determining orientation of a target object.

FIG. 30 provides a summary overview of steps involved in an application phase of the second method wherein composite filters developed during a training phase (FIG. 13) are applied to measure orientation of a target object. At box 160, a current image of the target object is obtained, and at box 162, this image is correlated with each of composite filter created as described earlier herein. Exogeneous information may be used to select filter pairs which bracket a rough estimate of the target aspect at which the target image was obtained. At box 164, an interpolation is performed (e.g., using equations (8) and (9)), between roll and yaw aspects for filters with the highest peaks for each axis of rotation, to obtain an estimate of target pose (i.e., orientation) at the time the target image was acquired. For embodiments which include a tracking function, an estimate of a target orientation at a future time is made, using conventional tracking techniques, based on the current estimate of target orientation and a history of orientation measurements for the target object (e.g., to determine roll rate or yaw rate). At box 168, a determination is made whether to continue tracking. If affirmative, the process loops back to obtain another image of the target at box 160, but if not, the process ends.

Having thus disclosed our invention and the manner of its use, it should be apparent that incidental changes may be made thereto that fairly fall within the scope of the following appended claims, wherein we claim:

1. A method Performed in an optical correlator for determining orientation of a target object comprising:

an optical correlator, developing a first reference filter comprising incrementally varying a first aspect of orientation of a plurality of training images taken from a viewpoint of said target object to develop at least one first correlation strength surface defining degrees of correlation with, and thus sensitive to, said corresponding first aspect of said target object, developing a second reference filter comprising incrementally varying a second aspect of orientation of the a plurality of training images taken from the viewpoint of said target object to develop at least one second correlation strength surface defining degrees of correlation with, and thus sensitive to, said corresponding second aspect of said target object, developing a third reference filter comprising incrementally varying a third aspect of orientation of the a plurality of training images taken from the viewpoint of said target object to develop at least one third correlation strength surface defining degrees of correlation with, and thus sensitive to, said corresponding third aspect of said target object, acquiring a target image of said target object, performing correlations of said target image with said first reference filter, said second reference filter and said third reference filter, determining orientation of said target object with respect to said first aspect, said second aspect and said third aspect by an intersection of correlation contours on said first correlation strength surface, said second correlation strength surface and said third correlation strength surface.

2. The method as set forth in claim 1 further comprising:

performing a Fourier transform on each training image of said plurality of training images for said first correlation strength surface, said second correlation strength surface and said third correlation strength surface, generating a complex conjugate of each said Fourier transform, combining respective complex conjugates of said Fourier transforms with respective ones of said first correlation strength surface, said second correlation strength surface and said third correlation strength surface, combining said first correlation strength surface, said second correlation strength surface and said third correlation strength surface into said first reference filter, said second reference filter and said third reference filter, respectively.

3. The method for determining orientation of a target object as set forth in claim 1 further comprising:

developing said first correlation strength surface using a said plurality of training images that incrementally vary in roll, developing said second correlation strength surface using a said plurality of training images that incrementally vary in pitch, and, developing said third correlation strength surface using a said plurality of training images that incrementally vary in yaw.

4. The method as set forth in claim 3 further comprising developing a fourth reference filter having a correlation strength surface developed comprising a said plurality of training images that incrementally vary in range.

5. A method Performed in an optical correlator for determining orientation of a target object comprising:

an optical correlator, developing a plurality of reference filters each containing at least one correlation strength surface defining degrees of correlation of orientation with said target object, and wherein a first said at least one correlation strength surface for a first said reference filter is developed using training images of said target object incrementally varying in roll, a second said at least one correlation strength surface for a second said reference filter is developed using training images of said target object incrementally varying in pitch, and a third said at least one correlation strength surface for a third said reference filter is developed using training images of said target object incrementally varying in yaw, and further wherein said first at least one correlation strength surface, said second at least one correlation strength surface and said third at least one correlation strength surface are sensitive to roll, pitch and yaw of said target object, acquiring a target image of said target object, performing correlations of said target image with said first reference filter, said second reference filter, and said third reference filter, whereby an intersection of correlation contours defined on said at least one first correlation strength surface, said at least one second correlation strength surface, and said at least one third correlation strength surface is indicative of said roll, said pitch and said yaw of said target object.

6. The method for determining orientation of a target object as set forth in claim 5 further comprising:

developing each of said first reference filter, said second reference filter and said third reference filter;

performing a Fourier transform on each of respective said training images for said first at least one correlation strength surface, said at least one second correlation strength surface, and said at least one third correlation strength surface, generating a complex conjugate from each said Fourier transform, including said complex conjugates of respective ones of said first correlation strength surface, said second correlation strength surface and said third correlation strength surface into respective ones of said first reference filter, said second reference filter and said third reference filter.

7. The method as set forth in claim 5 further comprising developing a fourth reference filter having a fourth at least one correlation strength surface from a group of said training images incrementally varying in range.

* * * * *